United States Patent
Tartz et al.

(10) Patent No.: US 11,461,986 B2
(45) Date of Patent: Oct. 4, 2022

(54) CONTEXT-AWARE EXTENDED REALITY SYSTEMS

(71) Applicant: QUALCOMM Incorporated, San Diego, CA (US)

(72) Inventors: Robert Tartz, San Marcos, CA (US); Jonathan Kies, Encinitas, CA (US); Daniel James Guest, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/159,955

(22) Filed: Jan. 27, 2021

(65) Prior Publication Data

US 2022/0237878 A1 Jul. 28, 2022

(51) Int. Cl.
*G06T 19/20* (2011.01)
*G06T 19/00* (2011.01)
*G06F 3/01* (2006.01)
*G06F 3/14* (2006.01)
*G06V 20/00* (2022.01)

(52) U.S. Cl.
CPC .............. *G06T 19/20* (2013.01); *G06F 3/011* (2013.01); *G06F 3/14* (2013.01); *G06T 19/006* (2013.01); *G06V 20/00* (2022.01); *G06T 2219/2016* (2013.01)

(58) Field of Classification Search
CPC .............. G06T 19/20; G06T 19/006; G06T 2219/2016; G06T 7/70; G06T 2207/20101; G06T 7/20; G06T 7/60; G06V 20/00; G06F 3/011; G06F 3/14; G06F 3/013; G06F 3/017
See application file for complete search history.

(56) References Cited

U.S. PATENT DOCUMENTS

| | | | |
|---|---|---|---|
| 2016/0027212 A1 | 1/2016 | Da Veiga et al. | |
| 2016/0214015 A1 | 7/2016 | Osman et al. | |
| 2017/0178601 A1* | 6/2017 | Bloch | G06F 3/012 |
| 2017/0337444 A1 | 11/2017 | Novak | |
| 2018/0365875 A1* | 12/2018 | Yildiz | G06F 3/013 |
| 2019/0035293 A1* | 1/2019 | Mei | G09B 5/02 |
| 2019/0094952 A1 | 3/2019 | Bostick et al. | |
| 2019/0384976 A1 | 12/2019 | Lee | |
| 2021/0373664 A1* | 12/2021 | Duarte De Oliveira | G06F 3/012 |

* cited by examiner

*Primary Examiner* — Xilin Guo
(74) *Attorney, Agent, or Firm* — Polsinelli LLP

(57) ABSTRACT

Techniques and systems are provided for dynamically adjusting virtual content provided by an extended reality system. In some examples, a system determines a level of distraction of a user of the extended reality system due to virtual content provided by the extended reality system. The system determines whether the level of distraction of the user due to the virtual content exceeds or is less than a threshold level of distraction, where the threshold level of distraction is determined based at least in part on one or more environmental factors associated with a real world environment in which the user is located. The system also adjusts one or more characteristics of the virtual content based on the determination of whether the level of distraction of the user due to the virtual content exceeds or is less than the threshold level of distraction.

34 Claims, 9 Drawing Sheets

700

---

Determine a level of distraction of a user of an extended reality system due to virtual content provided by the extended reality system
702

↓

Determine whether the level of distraction of the user due to the virtual content exceeds or is less than a threshold level of distraction, the threshold level of distraction being determined based at least in part on one or more environmental factors associated with a real world environmental in which the user is located
704

↓

Adjust one or more characteristics of the virtual content based on the determination of whether the level of distraction of the user due to the virtual content exceeds or is less than the threshold level of distraction
706

FIG. 7

CONTEXT-AWARE EXTENDED REALITY SYSTEMS

FIELD

The present disclosure generally relates to context-aware extended reality systems. In some examples, aspects of the present disclosure are related to adjusting virtual content provided by an extended reality system based on features of a real world environment in which the extended reality system is located.

BACKGROUND

Extended reality technologies can be used to present virtual content to users, and/or can combine real environments from the physical world and virtual environments to provide users with extended reality experiences. The term extended reality can encompass virtual reality, augmented reality, mixed reality, and the like. Extended reality systems can allow users to experience extended reality environments by overlaying virtual content onto images of a real world environment, which can be viewed by a user through an extended reality device (e.g., a head-mounted display, extended reality glasses, or other device). While the goal of many extended reality systems is to create realistic, interactive, and fully immersive extended reality environments, extended reality systems should also ensure that virtual content does not create potentially dangerous situations for users, or otherwise prevent users from properly interacting with the real world environment. Improved extended reality systems are needed to dynamically adapt virtual content based on features of the real world environment.

Systems and techniques are described herein for adjusting virtual content within extended reality systems. According to at least one example, apparatuses are provided for adjusting virtual content within extended reality systems. An example apparatus can include memory and one or more processors (e.g., configured in circuitry). The one or more processors are configured to: determine a level of distraction of a user of an extended reality system due to virtual content provided by the extended reality system; determine whether the level of distraction of the user due to the virtual content exceeds a threshold level of distraction, the threshold level of distraction being determined based at least in part on one or more environmental factors associated with a real world environment in which the user is located; and adjust one or more characteristics of the virtual content based on the determination of whether the level of distraction of the user due to the virtual content exceeds the threshold level of distraction.

In another example, an apparatus is provided for adjusting virtual content within extended reality systems. The apparatus comprises: means for determining a level of distraction of a user of an extended reality system due to virtual content provided by the extended reality system; means for determining whether the level of distraction of the user due to the virtual content exceeds a threshold level of distraction, the threshold level of distraction being determined based at least in part on one or more environmental factors associated with a real world environment in which the user is located; and means for adjusting one or more characteristics of the virtual content based on the determination of whether the level of distraction of the user due to the virtual content exceeds the threshold level of distraction.

In another example, methods are provided for adjusting virtual content within extended reality systems. An example method can include determining a level of distraction of a user of an extended reality system due to virtual content provided by the extended reality system. The method can also include determining whether the level of distraction of the user due to the virtual content exceeds or is less than a threshold level of distraction, the threshold level of distraction being determined based at least in part on one or more environmental factors associated with a real world environment in which the user is located. The method further includes adjusting one or more characteristics of the virtual content based on the determination of whether the level of distraction of the user due to the virtual content exceeds or is less than the threshold level of distraction.

In another example, non-transitory computer-readable media are provided for adjusting virtual content within extended reality systems. An example non-transitory computer-readable medium can store instructions that, when executed by one or more processors, cause the one or more processors to: determine a level of distraction of a user of an extended reality system due to virtual content provided by the extended reality system; determine whether the level of distraction of the user due to the virtual content exceeds or is less than a threshold level of distraction, the threshold level of distraction being determined based at least in part on one or more environmental factors associated with a real world environment in which the user is located; and adjust one or more characteristics of the virtual content based on the determination of whether the level of distraction of the user due to the virtual content exceeds or is less than the threshold level of distraction.

In some aspects, determining the level of distraction of the user of the extended reality system due to the virtual content provided by the extended reality system can include determining a level of engagement between the user and the virtual content. In some examples, determining the level of engagement between the user and the virtual content can include monitoring one or more physical behaviors of the user. The one or more physical behaviors can indicate at least one of a virtual object and a physical object on which the user is focusing. Additionally or alternatively, determining the level of distraction of the user of the extended reality system due to the virtual content provided by the extended reality system can include determining a prominence of the virtual content within a display of the extended reality system, a high prominence being associated with a high level of distraction. In some examples, determining the prominence of the virtual content within the display of the extended reality system can include determining at least one of a volume of audio of the virtual content, a size of the virtual content, a type of the virtual content, a brightness of the virtual content, a transparency of the virtual content, a level of movement of the virtual content, one or more color characteristics of the virtual content, a vibration intensity of the virtual content, a vibration frequency of the virtual content, a vibration duration of the virtual content, a field of view of the virtual content, a visual depth of the virtual content, and a position of the virtual content.

In some aspects, the one or more environmental factors include a physical object within the real world environment. In some examples, the one or more environmental factors include an interaction between the user of the extended reality system and a person.

In some aspects, the threshold level of distraction can be determined based at least in part on determining a level of importance of the one or more environmental factors, where a low threshold level of distraction is associated with a high level of importance of the one or more environmental factors. In some examples, an environmental factor with a high safety risk to the user can be associated with a high level of importance.

In some examples, determining whether the level of distraction of the user due to the virtual content exceeds the threshold level of distraction includes determining that the level of distraction of the user exceeds the threshold level of distraction. In these examples, adjusting the one or more characteristics of the virtual content can include outputting, via a display of the extended reality system, an indication of the one or more environmental factors. Additionally or alternatively, adjusting the one or more characteristics of the virtual content can include decreasing a prominence of the virtual content within a display of the extended reality system.

In some examples, determining whether the level of distraction of the user due to the virtual content exceeds the threshold level of distraction includes determining that the level of distraction of the user is less than the threshold level of distraction. In these examples, adjusting the one or more characteristics of the virtual content can include increasing a prominence of the virtual content within a display of the extended reality system. In some examples, an updated level of distraction of the user of the extended reality system due to the virtual content with the adjusted one or more characteristics can be determined. These examples can include determining an updated threshold level of distraction based at least in part on one or more updated environmental factors associated with the real world environment, the one or more updated environmental factors being at least partially different than the one or more environmental factors. These examples can also include determining that the updated level of distraction of the user due to the virtual content with the adjusted one or more characteristics exceeds the updated threshold level of distraction and further adjusting the one or more characteristics of the virtual content based on determining that the updated level of distraction exceeds the updated threshold level of distraction. Further adjusting the one or more characteristics of the virtual content can decrease a prominence of the virtual content provided by the extended reality system. These examples can also include determining that the updated level of distraction of the user due to the virtual content with the adjusted one or more characteristics is less than the updated threshold level of distraction. These examples can also include further adjusting the one or more characteristics of the virtual content based on determining that the updated level of distraction is less than the updated threshold level of distraction, where further adjusting the one or more characteristics of the virtual content can increase a prominence of the virtual content provided by the extended reality system.

In some aspects, the methods, apparatuses, and computer-readable media described herein can include, be part of, and/or be implemented by an extended reality device (e.g., a virtual reality device, an augmented reality device, and/or a mixed reality device), a mobile device (e.g., a mobile telephone or so-called "smart phone" or other mobile device), a wearable device, a personal computer, a laptop computer, a server computer, or other device. In some aspects, the apparatus includes a camera or multiple cameras for capturing one or more images. In some aspects, the apparatus includes a display for displaying one or more images, notifications, and/or other displayable data. In some aspects, the apparatuses described above can include one or more sensors (e.g., one or more accelerometers, gyroscopes, inertial measurement units (IMUs), motion detection sensors, and/or other sensors).

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and examples, will become more apparent upon referring to the following specification, claims, and accompanying drawings.

BRIEF DESCRIPTION OF THE DRAWINGS

Illustrative examples of the present application are described in detail below with reference to the following figures:

FIG. 7 is a flow diagram illustrating an example of a process for adjusting virtual content within extended reality environments, in accordance with some examples.

DETAILED DESCRIPTION

Figure 1:
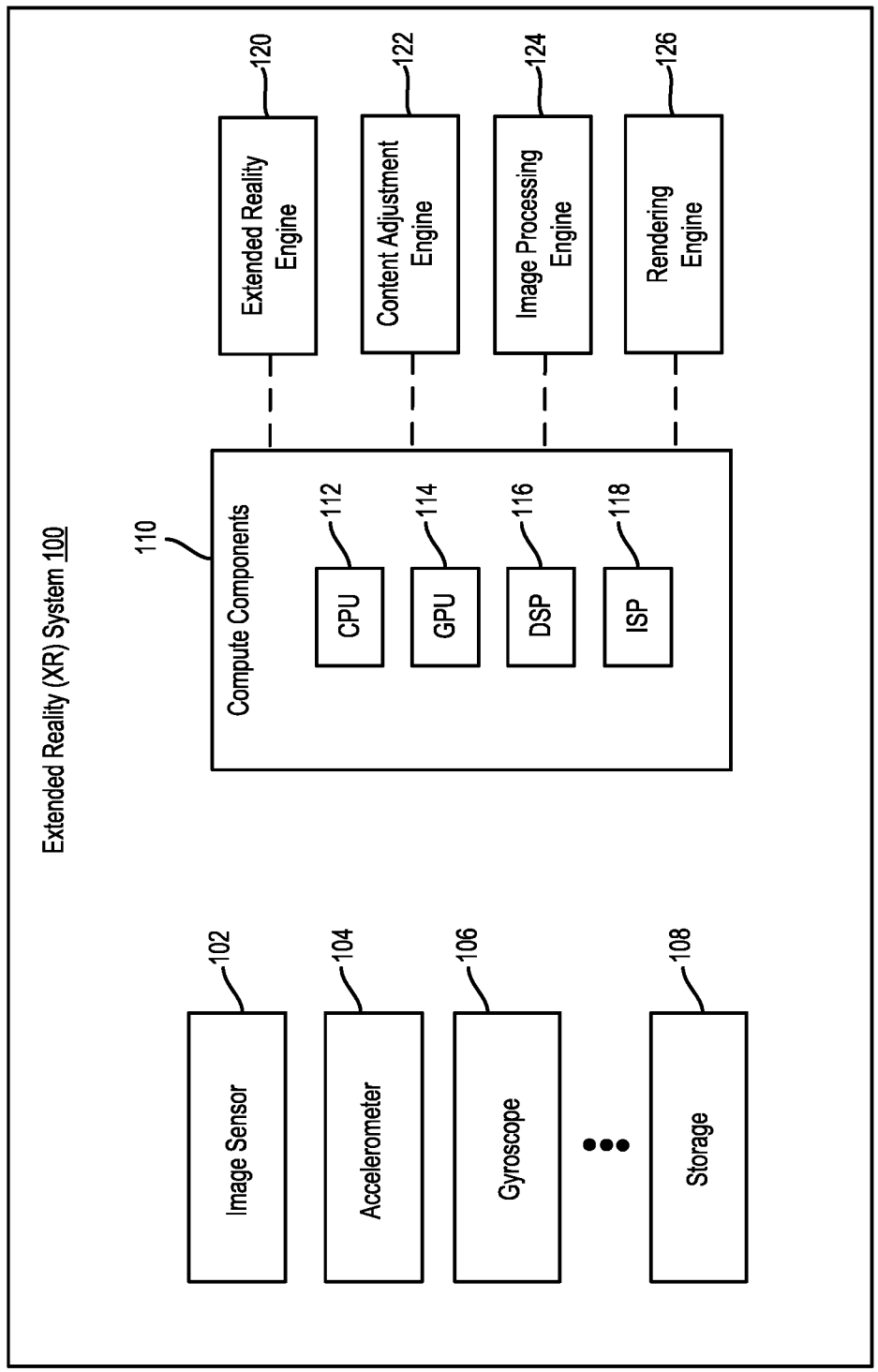
FIG. 1 is a block diagram illustrating an example architecture of an extended reality system, in accordance with some examples.

Certain aspects and examples of this disclosure are provided below. Some of these aspects and examples may be applied independently and some of them may be applied in combination as would be apparent to those of skill in the art. In the following description, for the purposes of explanation, specific details are set forth in order to provide a thorough understanding of subject matter of the application. However, it will be apparent that various examples may be practiced without these specific details. The figures and description are not intended to be restrictive.

The ensuing description provides illustrative examples only, and is not intended to limit the scope, applicability, or configuration of the disclosure. Rather, the ensuing description will provide those skilled in the art with an enabling description for implementing the illustrative examples. It should be understood that various changes may be made in the function and arrangement of elements without departing from the spirit and scope of the application as set forth in the appended claims.

Extended reality (XR) devices or systems can facilitate interactions with different types of XR environments, including virtual reality (VR) environments, augmented reality (AR) environments, mixed reality (MR) environments, and/or other XR environments. An XR device or system can be used by a user to interact with an XR environment. Examples of XR devices or systems include head-mounted displays (HMDs), XR glasses, among others.

An XR device or system can cause virtual content to be overlaid onto images of a real world environment, which can be viewed by a user through the XR device or system. Some XR devices or systems may provide accompanying audio content. The real world environment can include physical objects, people, or other real world objects. An XR device or system can track parts of the user (e.g., a hand and/or fingertips of the user) to allow the user to interact with items of virtual content.

In some cases, the immersive nature of XR devices or systems may prevent users from properly or safely interacting with their real world environment, such as when moving about the environment. For instance, virtual content presented to a user can obscure or cover safety hazards, such as heavy furniture, stairs, traffic, etc. In addition, a user immersed in virtual content may have problems seeing or hearing other people, and may even be unaware of other people attempting to communicate with them. These problems are exacerbated when users are particularly distracted by virtual content. While the goal of many XR systems is to create realistic, interactive, and fully immersive XR environments, XR systems should also ensure that virtual content does not create potentially dangerous situations for users, or otherwise prevent users from properly interacting with the real world environment.

The present disclosure describes systems, apparatuses, methods, and computer-readable media (collectively referred to as "systems and techniques") for providing context-aware XR environments. The systems and techniques described herein provide the ability for an XR system or device (e.g., an HMD, AR glasses, etc.) to dynamically adjust virtual content provided to a user based on a level of distraction of the user due to the virtual content. For instance, the XR system can adjust the virtual content to lower the user's level of distraction. By adjusting the virtual content in such a manner, the XR system triggers or otherwise enables the user to focus on environmental factors associated with the real world environment. The term "environmental factor," as used herein, can refer to any element or aspect of the real world environment that potentially requires or draws the user's attention. In one example, an environmental factor can include an attempt by one or more people to communicate with the user. Additionally or alternatively, an environmental factor can include safety hazards or risks (e.g., cars, stairs, animals, furniture, physical obstacles, etc.) nearby the user, in a path or trajectory of the user, or otherwise in the vicinity of the user. In some cases, the XR system can monitor (e.g., using various types of sensors) the real world environment to detect environmental factors that may be relevant to the user. The XR system can adjust the virtual content based on the detected environmental factors.

In some cases, the XR system can determine the user's level of distraction due to the virtual content by determining a level of engagement between the user and the virtual content. A high level of engagement with the virtual content can indicate that the user is highly distracted by the virtual content and, therefore, unlikely to be focusing on environmental factors within the real world environment. In some examples, the XR system can determine the level of engagement between the user and the virtual content by identifying objects (e.g., virtual objects and/or physical objects) on which the user is focusing, detecting user motions associated with providing input to the XR system, monitoring the user's physiological responses, and/or in any other suitable manner. In some cases, the XR system can determine the user's level of distraction due to the virtual content based on a prominence of the virtual content. Prominence of virtual content can be based on a size of the virtual content, placement of the virtual content on a display of the XR system (e.g., virtual content in the middle of the display may be more prominent than virtual content in a corner of the display), an audio level of the virtual content, a brightness of the virtual content, an amount of movement of the virtual content, any combination thereof, and/or other characteristic of the virtual content. For example, highly prominent virtual content (e.g., virtual content that is large, loud, animated, etc.) may be more distracting than less prominent virtual content. In some examples, the XR system can determine the user's level of distraction due to the virtual content based on both the level of engagement between the user and the virtual content and the prominence of the virtual content. For instance, the XR system can combine quantitative measurements of the level of engagement and the content prominence to determine an overall level of the user's distraction.

The XR system can determine whether the user's level of distraction due to the virtual content is likely and/or expected to prevent the user from properly and/or safely handling the environmental factors within the real world environment. For example, the XR system can determine an environmental safety score (ESS) that represents a quantitative assessment of the safety hazards (or other features requiring the user's attention) within the environment. A high ESS can indicate a relatively safe environment. In addition, the XR system can determine a user distraction score (UDS) that represents a quantitative assessment of the user's level of distraction due to the virtual content. The XR system can compare the UDS to the ESS to determine whether to adjust virtual content being presented by the XR system. For instance, if the UDS exceeds the ESS (e.g., by at least a threshold amount), the XR system can decrease the prominence of the virtual content to enable the user to focus on the environmental factors. In an illustrative example, if the XR system determines the ESS and the UDS as values within a range of 1-10, the XR system can determine to decrease the prominence of the virtual content if the UDS exceeds the ESS by at a value of 1 (or any other suitable threshold amount). This threshold amount can be referred to as a safety threshold, as decreasing the prominence of the virtual content can help mitigate safety risks posed to the user by the environmental factors. In one example, the XR system can decrease the prominence of the virtual content by a weighted or proportional amount (e.g., relative to the difference between the ESS and the UDS). Examples of decreasing the prominence of the virtual content can include lowering the volume of audio content and/or reducing the size, placement, brightness, movement, etc. of visual content being displayed by the XR system.

In some examples, the XR system can indicate, to the user, one or more environmental factors by outlining, highlighting, pointing to, and/or otherwise emphasizing physical objects within a display of the XR system. For instance, using an augmented reality (AR) system as an example of the XR system, the AR system can display virtual content on a display. The display of the AR system (e.g., lenses of AR glasses) can allow a user to also view the real world environment. Using the AR system, the user can view the virtual content overlaid over the real world environment. In such an example, the AR system can display an outline, can highlight, can point to, and/or otherwise emphasize a physical object of the virtual environment being viewed through the display of the AR system.

In some cases, the XR system can determine that the user's level of distraction due to the virtual content is unlikely and/or unexpected to prevent the user from properly and/or safely handling the environmental factors. For example, the XR system can determine that the UDS does not exceed the ESS (e.g., by at least a threshold amount). In some cases, the XR system can determine that adjustments to the virtual content are unnecessary if the UDS does not exceed the ESS (e.g., by at least the threshold amount). In other cases, the XR system can adjust the virtual content by increasing the prominence of the virtual content. For example, the XR system can determine that the user is capable of experiencing a greater amount of virtual content while properly handling the environmental factors. In an illustrative example, if the XR system determines the ESS and the UDS as values within a range of 1-10, the XR system can determine to increase the prominence of the virtual content if the UDS is below the ESS by at least a value of 1 (or any other suitable threshold amount). This threshold amount can be referred to as a usability threshold, as increasing the prominence of the virtual content can increase the usability of the XR system and/or enhance the user's experience with the XR system. In one example, the XR system can increase the prominence of the virtual content by a weighted or proportional amount (e.g., relative to the difference between the ESS and the UDS). In some cases, increasing the prominence of the virtual content can increase the usability of the XR system and/or enhance the user's experience with the XR system. Examples of increasing the prominence of virtual content can include increasing the volume of audio content and/or increasing the size, placement, brightness, movement, etc. of visual content.

In some cases, the context-aware XR system can continuously or periodically adjust the virtual content based on changes in environmental factors within the real world environment and/or based on changes in the user's level of distraction due to the virtual content. For example, the XR system can include and/or correspond to a closed-loop system, where the prominence of the virtual content can represent feedback used to determine the user's level of distraction. In the closed-loop system, changes to the prominence of the virtual content can represent a system output, and a new state of the prominence of the virtual content can be fed back into the system (e.g., to account for changes in the user's level of distraction due to changes in the content prominence).

The disclosed context-aware XR systems and techniques can enable users to become fully immersed in XR environments without the risk of negative or harmful interactions with objects or elements in a real world environment. Further, by adjusting virtual content based on the surrounding environment, the systems and techniques can expand the types of environments in which users can enjoy XR applications.

Further details regarding context-aware XR systems are provided herein with respect to various figures. FIG. 1 is a diagram illustrating an example extended reality system 100, in accordance with some aspects of the disclosure. The extended reality system 100 can run (or execute) XR applications and implement XR operations. In some examples, the extended reality system 100 can perform tracking and localization, mapping of the physical world (e.g., a scene), and positioning and rendering of virtual content on a display (e.g., a screen, visible plane/region, and/or other display) as part of an XR experience. For example, the extended reality system 100 can generate a map (e.g., 3D map) of a scene in the physical world, track a pose (e.g., location and position) of the extended reality system 100 relative to the scene (e.g., relative to the 3D map of the scene), position and/or anchor virtual content in a specific location(s) on the map of the scene, and render the virtual content on the display. The extended reality system 100 can render the virtual content on the display such that the virtual content appears to be at a location in the scene corresponding to the specific location on the map of the scene where the virtual content is positioned and/or anchored. In some examples, the display can include a glass, a screen, a lens, and/or other display mechanism that allows a user to see the real-world environment and also allows XR content to be displayed thereon.

As shown in FIG. 1, the extended reality system 100 can include one or more image sensors 102, an accelerometer 104, a gyroscope 106, storage 108, compute components 110, an XR engine 120, a content adjustment engine 122, an image processing engine 124, and a rendering engine 126. It should be noted that the components 102-126 shown in FIG. 1 are non-limiting examples provided for illustrative and explanation purposes, and other examples can include more, less, or different components than those shown in FIG. 1. For example, in some cases, the extended reality system 100 can include one or more other sensors (e.g., one or more inertial measurement units (IMUs), radars, light detection and ranging (LIDAR) sensors, audio sensors, etc.), one or more display devices, one more other processing engines, one or more other hardware components, and/or one or more other software and/or hardware components that are not shown in FIG. 1. An example architecture and example hardware components that can be implemented by the extended reality system 100 are further described below with respect to FIG. 7.

For simplicity and explanation purposes, the one or more image sensors 102 will be referenced herein as an image sensor 102 (e.g., in singular form). However, one of ordinary skill in the art will recognize that the extended reality system 100 can include a single image sensor or multiple image sensors. Also, references to any of the components (e.g., 102-126) of the extended reality system 100 in the singular or plural form should not be interpreted as limiting the number of such components implemented by the extended reality system 100 to one or more than one. For example, references to an accelerometer 104 in the singular form should not be interpreted as limiting the number of accelerometers implemented by the extended reality system 100 to one. One of ordinary skill in the art will recognize that, for any of the components 102-126 shown in FIG. 1, the extended reality system 100 can include only one of such component(s) or more than one of such component(s).

The extended reality system 100 can include or be in communication with (wired or wirelessly) an input device. The input device can include any suitable input device, such as a touchscreen, a pen or other pointer device, a keyboard, a mouse a button or key, a microphone for receiving voice commands, a gesture input device for receiving gesture commands, any combination thereof, and/or other input device. In some cases, the image sensor 102 can capture images that can be processed for interpreting gesture commands.

The extended reality system 100 can be part of, or implemented by, a single computing device or multiple computing devices. In some examples, the extended reality system 100 can be part of an electronic device (or devices) such as an extended reality head-mounted display (HMD) device, extended reality glasses (e.g., augmented reality or AR glasses), a camera system (e.g., a digital camera, an IP camera, a video camera, a security camera, etc.), a telephone system (e.g., a smartphone, a cellular telephone, a conferencing system, etc.), a desktop computer, a laptop or notebook computer, a tablet computer, a set-top box, a smart television, a display device, a gaming console, a video streaming device, an Internet-of-Things (IoT) device, and/or any other suitable electronic device(s).

In some implementations, the one or more image sensors 102, the accelerometer 104, the gyroscope 106, storage 108, compute components 110, the XR engine 120, the content adjustment engine 122, the image processing engine 124, and the rendering engine 126 can be part of the same computing device. For example, in some cases, the one or more image sensors 102, the accelerometer 104, the gyroscope 106, storage 108, compute components 110, the XR engine 120, the content adjustment engine 122, image processing engine 124, and rendering engine 126 can be integrated into an HMD, extended reality glasses, smartphone, laptop, tablet computer, gaming system, and/or any other computing device. However, in some implementations, the one or more image sensors 102, the accelerometer 104, the gyroscope 106, storage 108, compute components 110, the XR engine 120, the content adjustment engine 122, the image processing engine 124, and the rendering engine 126 can be part of two or more separate computing devices. For example, in some cases, some of the components 102-126 can be part of, or implemented by, one computing device and the remaining components can be part of, or implemented by, one or more other computing devices.

The storage 108 can be any storage device(s) for storing data. Moreover, the storage 108 can store data from any of the components of the extended reality system 100. For example, the storage 108 can store data from the image sensor 102 (e.g., image or video data), data from the accelerometer 104 (e.g., measurements), data from the gyroscope 106 (e.g., measurements), data from the compute components 110 (e.g., processing parameters, preferences, virtual content, rendering content, scene maps, tracking and localization data, object detection data, privacy data, XR application data, face recognition data, occlusion data, etc.), data from the XR engine 120, data from the a content adjustment engine 122, data from the image processing engine 124, and/or data from the rendering engine 126 (e.g., output frames). In some examples, the storage 108 can include a buffer for storing frames for processing by the compute components 110.

The one or more compute components 110 can include a central processing unit (CPU) 112, a graphics processing unit (GPU) 114, a digital signal processor (DSP) 116, and/or an image signal processor (ISP) 118. The compute components 110 can perform various operations such as image enhancement, computer vision, graphics rendering, extended reality (e.g., tracking, localization, pose estimation, mapping, content anchoring, content rendering, etc.), image/video processing, sensor processing, recognition (e.g., text recognition, facial recognition, object recognition, feature recognition, tracking or pattern recognition, scene recognition, occlusion detection, etc.), machine learning, filtering, and any of the various operations described herein. In this example, the compute components 110 implement the XR engine 120, the content adjustment engine 122, the image processing engine 124, and the rendering engine 126. In other examples, the compute components 110 can also implement one or more other processing engines.

The image sensor 102 can include any image and/or video sensors or capturing devices. In some examples, the image sensor 102 can be part of a multiple-camera assembly, such as a dual-camera assembly. The image sensor 102 can capture image and/or video content (e.g., raw image and/or video data), which can then be processed by the compute components 110, the XR engine 120, the content adjustment engine 122, the image processing engine 124, and/or the rendering engine 126 as described herein.

In some examples, the image sensor 102 can capture image data and can generate frames based on the image data and/or can provide the image data or frames to the XR engine 120, the content adjustment engine 122, the image processing engine 124, and/or the rendering engine 126 for processing. A frame can include a video frame of a video sequence or a still image. A frame can include a pixel array representing a scene. For example, a frame can be a red-green-blue (RGB) frame having red, green, and blue color components per pixel; a luma, chroma-red, chroma-blue (YCbCr) frame having a luma component and two chroma (color) components (chroma-red and chroma-blue) per pixel; or any other suitable type of color or monochrome picture.

In some cases, the image sensor 102 (and/or other image sensor or camera of the extended reality system 100) can be configured to also capture depth information. For example, in some implementations, the image sensor 102 (and/or other camera) can include an RGB-depth (RGB-D) camera. In some cases, the extended reality system 100 can include one or more depth sensors (not shown) that are separate from the image sensor 102 (and/or other camera) and that can capture depth information. For instance, such a depth sensor can obtain depth information independently from the image sensor 102. In some examples, a depth sensor can be physically installed in a same general location the image sensor 102, but may operate at a different frequency or frame rate from the image sensor 102. In some examples, a depth sensor can take the form of a light source that can project a structured or textured light pattern, which may include one or more narrow bands of light, onto one or more objects in a scene. Depth information can then be obtained by exploiting geometrical distortions of the projected pattern caused by the surface shape of the object. In one example, depth information may be obtained from stereo sensors such as a combination of an infra-red structured light projector and an infra-red camera registered to a camera (e.g., an RGB camera).

As noted above, in some cases, the extended reality system 100 can also include one or more sensors (not shown) other than the image sensor 102. For instance, the one or more sensors can include one or more accelerometers (e.g., accelerometer 104), one or more gyroscopes (e.g., gyroscope 106), and/or other sensors. The one or more sensors can provide velocity, orientation, and/or other position-related information to the compute components 110. For example, the accelerometer 104 can detect acceleration by the extended reality system 100 and can generate acceleration measurements based on the detected acceleration. In some cases, the accelerometer 104 can provide one or more translational vectors (e.g., up/down, left/right, forward/back) that can be used for determining a position or pose of the extended reality system 100. The gyroscope 106 can detect and measure the orientation and angular velocity of the extended reality system 100. For example, the gyroscope 106 can be used to measure the pitch, roll, and yaw of the extended reality system 100. In some cases, the gyroscope 106 can provide one or more rotational vectors (e.g., pitch, yaw, roll). In some examples, the image sensor 102 and/or the XR engine 120 can use measurements obtained by the accelerometer 104 (e.g., one or more translational vectors) and/or the gyroscope 106 (e.g., one or more rotational vectors) to calculate the pose of the extended reality system 100. As previously noted, in other examples, the extended reality system 100 can also include other sensors, such as an inertial measurement unit (IMU), a magnetometer, a machine vision sensor, a smart scene sensor, a speech recognition sensor, an impact sensor, a shock sensor, a position sensor, a tilt sensor, etc.

In some cases, the one or more sensors can include at least one IMU. An IMU is an electronic device that measures the specific force, angular rate, and/or the orientation of the extended reality system 100, using a combination of one or more accelerometers, one or more gyroscopes, and/or one or more magnetometers. In some examples, the one or more sensors can output measured information associated with the capture of an image captured by the image sensor 102 (and/or other camera of the extended reality system 100) and/or depth information obtained using one or more depth sensors of the extended reality system 100.

The output of one or more sensors (e.g., the accelerometer 104, the gyroscope 106, one or more IMUs, and/or other sensors) can be used by the extended reality engine 120 to determine a pose of the extended reality system 100 (also referred to as the head pose) and/or the pose of the image sensor 102 (or other camera of the extended reality system 100). In some cases, the pose of the extended reality system 100 and the pose of the image sensor 102 (or other camera) can be the same. The pose of image sensor 102 refers to the position and orientation of the image sensor 102 relative to a frame of reference. In some implementations, the camera pose can be determined for 6-Degrees Of Freedom (6DOF), which refers to three translational components (e.g., which can be given by X (horizontal), Y (vertical), and Z (depth) coordinates relative to a frame of reference, such as the image plane) and three angular components (e.g. roll, pitch, and yaw relative to the same frame of reference).

In some cases, a device tracker (not shown) can use the measurements from the one or more sensors and image data from the image sensor 102 to track a pose (e.g., a 6DOF pose) of the extended reality system 100. For example, the device tracker can fuse visual data (e.g., using a visual tracking solution) from captured image data with inertial measurement data to determine a position and motion of the extended reality system 100 relative to the physical world (e.g., the scene) and a map of the physical world. As described below, in some examples, when tracking the pose of the extended reality system 100, the device tracker can generate a three-dimensional (3D) map of the scene (e.g., the real world) and/or generate updates for a 3D map of the scene. The 3D map updates can include, for example and without limitation, new or updated features and/or feature or landmark points associated with the scene and/or the 3D map of the scene, localization updates identifying or updating a position of the extended reality system 100 within the scene and the 3D map of the scene, etc. The 3D map can provide a digital representation of a scene in the real/physical world. In some examples, the 3D map can anchor location-based objects and/or content to real-world coordinates and/or objects. The extended reality system 100 can use a mapped scene (e.g., a scene in the physical world represented by, and/or associated with, a 3D map) to merge the physical and virtual worlds and/or merge virtual content or objects with the physical environment.

In some aspects, the pose of image sensor 102 and/or the extended reality system 100 as a whole can be determined and/or tracked by the compute components 110 using a visual tracking solution based on images captured by the image sensor 102 (and/or other camera of the extended reality system 100). For instance, in some examples, the compute components 110 can perform tracking using computer vision-based tracking, model-based tracking, and/or simultaneous localization and mapping (SLAM) techniques. For instance, the compute components 110 can perform SLAM or can be in communication (wired or wireless) with a SLAM engine (not shown). SLAM refers to a class of techniques where a map of an environment (e.g., a map of an environment being modeled by extended reality system 100) is created while simultaneously tracking the pose of a camera (e.g., image sensor 102) and/or the extended reality system 100 relative to that map. The map can be referred to as a SLAM map, and can be 3D. The SLAM techniques can be performed using color or grayscale image data captured by the image sensor 102 (and/or other camera of the extended reality system 100), and can be used to generate estimates of 6DOF pose measurements of the image sensor 102 and/or the extended reality system 100. Such a SLAM technique configured to perform 6DOF tracking can be referred to as 6DOF SLAM. In some cases, the output of the one or more sensors (e.g., the accelerometer 104, the gyroscope 106, one or more IMUs, and/or other sensors) can be used to estimate, correct, and/or otherwise adjust the estimated pose.

In some cases, the 6DOF SLAM (e.g., 6DOF tracking) can associate features observed from certain input images from the image sensor 102 (and/or other camera) to the SLAM map. For example, 6DOF SLAM can use feature point associations from an input image to determine the pose (position and orientation) of the image sensor 102 and/or extended reality system 100 for the input image. 6DOF mapping can also be performed to update the SLAM map. In some cases, the SLAM map maintained using the 6DOF SLAM can contain 3D feature points triangulated from two or more images. For example, key frames can be selected from input images or a video stream to represent an observed scene. For every key frame, a respective 6DOF camera pose associated with the image can be determined. The pose of the image sensor 102 and/or the extended reality system 100 can be determined by projecting features from the 3D SLAM map into an image or video frame and updating the camera pose from verified 2D-3D correspondences.

In one illustrative example, the compute components 110 can extract feature points from every input image or from each key frame. A feature point (also referred to as a registration point) as used herein is a distinctive or identifiable part of an image, such as a part of a hand, an edge of a table, among others. Features extracted from a captured image can represent distinct feature points along three-dimensional space (e.g., coordinates on X, Y, and Z-axes), and every feature point can have an associated feature location. The features points in key frames either match (are the same or correspond to) or fail to match the features points of previously-captured input images or key frames. Feature detection can be used to detect the feature points. Feature detection can include an image processing operation used to examine one or more pixels of an image to determine whether a feature exists at a particular pixel. Feature detection can be used to process an entire captured image or certain portions of an image. For each image or key frame, once features have been detected, a local image patch around the feature can be extracted. Features may be extracted using any suitable technique, such as Scale Invariant Feature Transform (SIFT) (which localizes features and generates their descriptions), Speed Up Robust Features (SURF), Gradient Location-Orientation histogram (GLOH), Normalized Cross Correlation (NCC), or other suitable technique.

In some cases, the extended reality system 100 can also track the hand and/or fingers of a user to allow the user to interact with and/or control virtual content in a virtual environment. For example, the extended reality system 100 can track a pose and/or movement of the hand and/or fingertips of the user to identify or translate user interactions with the virtual environment. The user interactions can include, for example and without limitation, moving an item of virtual content, resizing the item of virtual content and/or a location of the virtual private space, selecting an input interface element in a virtual user interface (e.g., a virtual representation of a mobile phone, a virtual keyboard, and/or other virtual interface), providing an input through a virtual user interface, etc.

The operations for the XR engine 120, the content adjustment engine 122, the image processing engine 124, and the rendering engine 126 (and any image processing engines) can be implemented by any of the compute components 110. In one illustrative example, the operations of the rendering engine 126 can be implemented by the GPU 114, and the operations of the XR engine 120, the content adjustment engine 122, and the image processing engine 124 can be implemented by the CPU 112, the DSP 116, and/or the ISP 118. In some cases, the compute components 110 can include other electronic circuits or hardware, computer software, firmware, or any combination thereof, to perform any of the various operations described herein.

In some examples, the XR engine 120 can perform XR operations to generate an XR experience based on data from the image sensor 102, the accelerometer 104, the gyroscope 106, and/or one or more sensors on the extended reality system 100, such as one or more IMUs, radars, etc. In some examples, the XR engine 120 can perform tracking, localization, pose estimation, mapping, content anchoring operations and/or any other XR operations/functionalities. An XR experience can include use of the extended reality system 100 to present XR content (e.g., virtual reality content, augmented reality content, mixed reality content, etc.) to a user during a virtual session. In some examples, the XR content and experience can be provided by the extended reality system 100 through an XR application (e.g., executed or implemented by the XR engine 120) that provides a specific XR experience such as, for example, an XR gaming experience, an XR classroom experience, an XR shopping experience, an XR entertainment experience, an XR activity (e.g., an operation, a troubleshooting activity, etc.), among others. During the XR experience, the user can view and/or interact with virtual content using the extended reality system 100. In some cases, the user can view and/or interact with the virtual content while also being able to view and/or interact with the physical environment around the user, allowing the user to have an immersive experience between the physical environment and virtual content mixed or integrated with the physical environment.

The content adjustment engine 122 can perform various operations to determine adjustments to virtual content (or other types of XR content) provided by the extended reality system 100. An adjustment to virtual content, as used herein, can include any modification, change, and/or deviation to the virtual content as configured by an XR application. For instance, an XR application, while running within the extended reality system 100, can generate and/or configure virtual content to be displayed to a user. The content adjustment engine 122 can determine one or more adjustments to be applied to the generated and/or configured virtual content. The image processing engine 124 and/or the rendering engine 126 can then apply the adjustments to the virtual content such that the virtual content experienced by the user reflects the adjustments. As will be explained below, the content adjustment engine 122 can determine adjustments to virtual content based on current contextual factors associated with the user's XR experience. The contextual factors can include environmental factors associated with the real world environment, the prominence of the virtual content (e.g., before the virtual content is adjusted), and/or a level of engagement between the user and the virtual content.

Figure 2:
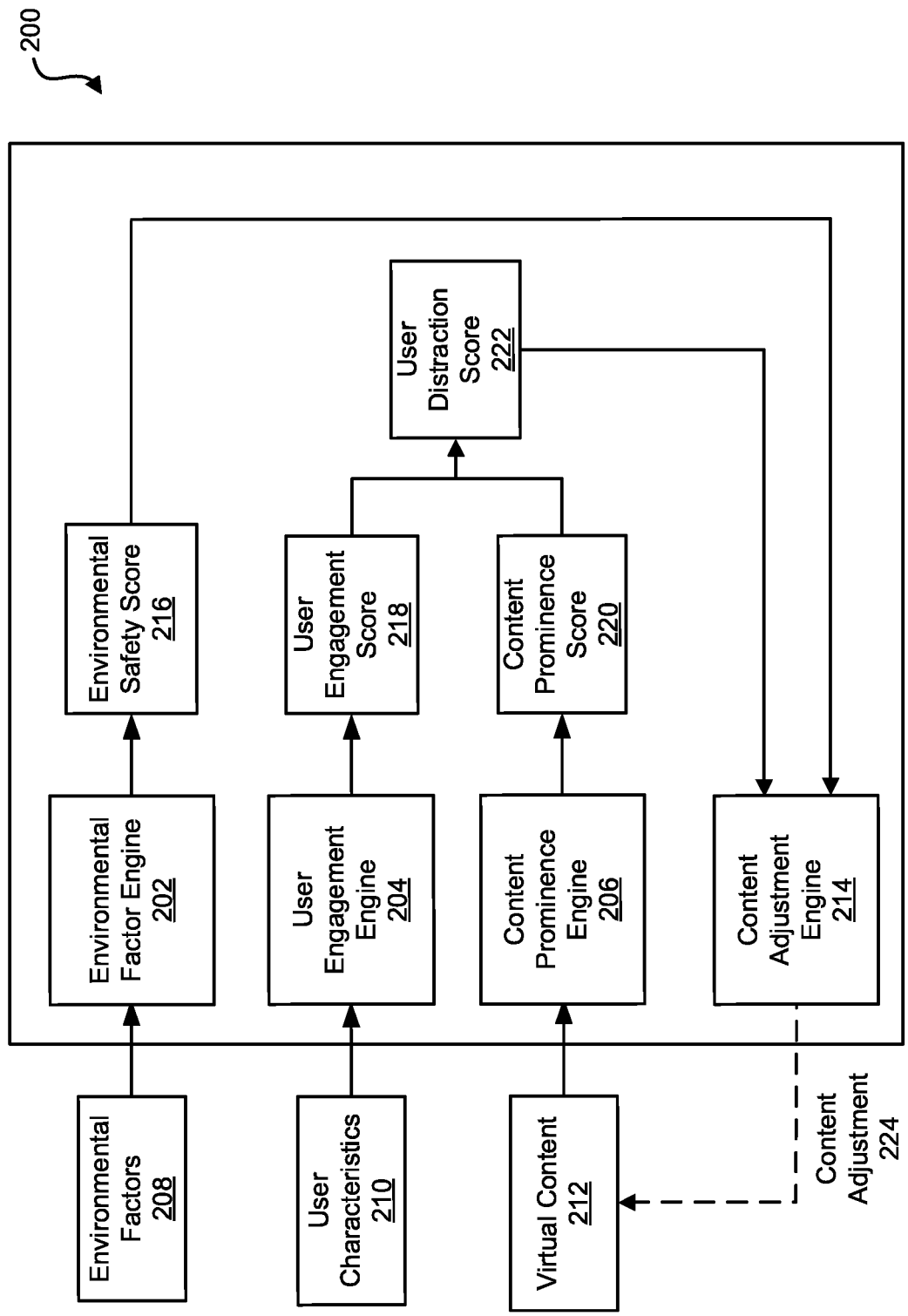
FIG. 2 is a block diagram illustrating an example of a system for adjusting virtual content within extended reality environments, in accordance with some examples.

FIG. 2 is a block diagram illustrating an example of a content adjustment system 200. In some cases, the content adjustment system 200 can include and/or be part of the extended reality system 100 in FIG. 1. For instance, the content adjustment system 200 can correspond to all or a portion of the content adjustment engine 122. As shown in FIG. 2, the content adjustment system 200 can include one or more engines, including an environmental factor engine 202, a user engagement engine 204, a content prominence engine 206, and a content adjustment engine 214. The engines of the content adjustment system 200 can be configured to determine a content adjustment 224. The content adjustment 224 can include any type or number of adjustments to virtual content (e.g., virtual content 212) displayed on a display of the extended reality system 100 and that can be viewed by a user of the extended reality system 100.

In some cases, the content adjustment system 200 can determine the content adjustment 224 based at least in part on one or more environmental factors (e.g., environmental factors 208) associated with the real world environment. As described above, an environmental factor can include any element or aspect of the real world environment that potentially requires and/or involves the user's attention. In some examples, environmental factors 208 can include a safety hazard, such as a flight of stairs, traffic, a physical object in a path of the user (e.g., a street sign, a piece of furniture, etc.), among others. In other examples, environmental factors 208 can include a complexity of the environment. For instance, the complexity of the environment can be based on an overall assessment of the level of clutter, movement, noise, etc. within the environment. In some cases, a complex environment may result in a user directing a greater amount of attention to virtual content in order to process the virtual content (e.g., in order to separate the virtual content from the complex environment). In some examples, environmental factors 208 can include potential interactions with one or more people. For instance, environmental factors 208 can include an attempt by a person to communicate with the user. Additionally or alternatively, environmental factors 208 can include ambient and/or geographical characteristics of the real world environment. For instance, environmental factors 208 can include a temperature of the environment, a temperature of one or more physical objects within the environment, a level of lighting within the environment, a type of the environment (e.g., whether the environment is a public space, inside a building, etc.), and/or other ambient and/or geographical characteristics of the real world environment. In one example, a high level of environmental lighting may reduce the visibility of virtual content and, therefore, result in the user directing a greater amount of attention to the virtual content. In another example, an object with a high temperature (e.g., a fireplace or stovetop) can represent a safety hazard to the user. In some cases, environmental factors 208 can include a location of the environment (e.g., a particular street, city, or other geographic region associated with the environment). In some cases, environmental factors 208 can include historical and/or previously identified environmental factors associated with the environment. For instance, environmental factors 208 can include trends and/or documented rates of traffic, crimes, injuries, etc. within the environment.

The environmental factor engine 202 can determine environmental factors 208 using various techniques and/or devices. In some examples, the environmental factor engine 202 can analyze image or video data captured by one or more cameras or image sensors (e.g., image sensor 102 of the extended reality system 100) to determine environmental factors 208. For instance, the environmental factor engine 202 can detect and/or identify physical objects, safety hazards, people, etc. using various image processing techniques. Such safety hazards can include stairs, parked vehicles, furniture, pets, busy streets, among other safety hazards. Further, in some cases, the environmental factor engine 202 can use various image processing techniques to detect visual markers (e.g., Quick Response (QR) codes) placed in the environment to indicate safety hazards. The image processing techniques can include object detection algorithms, object recognition algorithms, facial recognition algorithms, any combination thereof, and/or other image processing techniques. In some examples, the environmental factor engine 202 can determine the complexity of the environment using a spatial frequency analysis or similar analysis. In some examples, the environmental factor engine 202 can determine ambient and/or physical conditions of the environment using sensors such as LIDAR sensors, audio sensors, thermometers, any combination thereof, and/or other sensors or devices. In further examples, the environmental factor engine 202 can determine the location of the real world environment in which the extended reality system 100 is located using a network connection and/or a positioning system (e.g., a Global Positioning System (GPS)). The environmental factor engine 202 can detect any additional or alternative type of environmental factor using any suitable technique and/or device.

As shown in FIG. 2, the environmental factor engine 202 can determine an environmental safety score (ESS) 216 based at least in part on environmental factors 208. The ESS 216 can represent a quantitative assessment of the risk posed to the user due to safety hazards (or other factors requiring the user's attention) within the environment. For instance, the value of the ESS 216 can correspond to an amount of attention that the combination of environmental factors 208 may require from the user (e.g., in order for the user to safely and/or properly handle or address the environmental factors 208). In some cases, a high ESS 216 can indicate a low level of user attention is needed to address objects or other items in an environment) and a low ESS 216 can indicate a high level of user attention. For instance, environmental factors associated with high safety risks can be associated with low environmental safety scores. In some cases, environmental factors that are expected to require a large amount of attention from the user can be referred to as "important" environmental factors, while environmental factors that are not expected to require a large amount of attention from the user can be referred to as "unimportant" environmental factors.

In some examples, the environmental factor engine 202 can determine the ESS 216 by weighting individual environmental factors within environmental factors 208. For instance, the environmental factor engine 202 can assign a numerical score to each environmental factor that is determined to be present and/or relevant within the real world environment in which the XR system is located. In a non-limiting example, the environmental factor engine 202 can assign each environmental factor a score within a predetermined range (e.g., a range of 1-10, where a score of 1 corresponds to the lowest level of environmental safety and a score of 10 corresponds to highest level of environmental safety). The numerical value of a score assigned to an environmental factor can correspond to the relative importance of the environmental factor. For instance, an environmental score with a high importance may be assigned a low score (corresponding to a high level of user attention). In some cases, the environmental factor engine 202 can combine (e.g., by determining an average or mean or other representative value) the individual scores of each of environmental factors 208 to generate an ESS 216 that represents a cumulative assessment of the environmental factors 208. In a non-limiting example, the environmental factor engine 202 may identify and assign a score to four environmental factors, as follows: (1) a chair located 3 feet to the right of the user, assigned a score of 7; (2) a flight of downwards stairs 3 feet in front of the user, assigned a score of 2; (3) a television providing both audio and visual content within the same room as the user, assigned a score of 4; and (4) a high level of ambient light within the environment, assigned a score of 5. In this example, the environmental factor engine 202 can determine the ESS 216 by averaging the individual scores, resulting in an ESS 216 of 4.5.

In some cases, the content adjustment system 200 can determine the content adjustment 224 based at least in part on one or more characteristics of the user (e.g., user characteristics 210). User characteristics 210 can include any number or type of behaviors, reactions, physiological states, and/or other features of the user associated with a level of engagement between the user and the virtual content 212. In some cases, a high level of engagement between the user and the virtual content 212 can correspond to the user being highly distracted from the real world environment due to the virtual content 212. Accordingly, a high level of engagement between the user and the virtual content 212 may be associated with an increased risk of the user experiencing an unsafe or otherwise undesirable interaction with the real world environment. For instance, a user that is highly distracted by virtual content may fail to notice a safety hazard (e.g., a physical object in their path, such as a street, stairs, etc.) and/or may fail to notice that a person is attempting to communicate with the user.

In one example, user characteristics 210 can include physical behaviors that indicate one or more objects the user is viewing and/or tracking. For instance, the user engagement engine 204 can track the direction of the user's gaze (e.g., using one or more eye tracking techniques) to determine whether the one or more objects include virtual content (indicating a high level of engagement with the virtual content) or physical objects (indicating a lower level of engagement with the virtual content). In another example, user characteristics 210 can include motions associated with providing input to an XR application. For instance, the user engagement engine 204 can detect when the user performs particular gestures (e.g., hand gestures) corresponding to inputs to an XR application and/or when the user interacts with a controller of an XR application. Frequent motions associated with providing input to an XR application can indicate a high level of engagement with virtual content 212. In a further example, user characteristics 210 can include speech of the user. For instance, the user engagement engine 204 can determine whether speech by the user is related to the virtual content 212 (e.g., interactions with other users of an XR application, instructions to an XR application, etc.) or related to the real world environment (e.g., speech directed to people not using an XR application). Speech related to the virtual content 212 may be associated with a higher level of engagement with the virtual content 212. In another example, user characteristics 210 can include movement of the user. For instance, the user engagement engine 204 can detect when the user is sitting, walking, running, etc. In some cases, fast and/or varied movement (e.g., movement in more than one direction and/or speed) can indicate that the user is highly engaged with the virtual content 212. In addition, fast and/or varied movement can be associated with an increased risk of injury to the user due to safety hazards in the real world environment. In some cases, user characteristics 210 can include physiological states and/or physiological reactions of the user. For instance, the user engagement engine 204 can monitor the user's heart rate, breathing rate, and/or any additional biological metrics associated with the user. In some cases, biological metrics with elevated values (e.g., compared to baseline or resting values) may be associated with a high level of engagement with the virtual content 212.

The user engagement engine 204 can determine user characteristics 210 using various techniques and/or devices. In some examples, the user engagement engine 204 can utilize eye tracking techniques and/or focal plane detection sensors and/or algorithms to track the gaze of the user. Such sensors and/or algorithms can determine whether the user is visually focusing on (e.g., viewing and/or tracking) virtual content or real world content. In further examples, the user engagement engine 204 can analyze image or video data captured by one or more cameras or image sensors (e.g., image sensor 102 of the extended reality system 100) to detect hand gestures or other input gestures of the user. In other examples, the user engagement engine 204 can utilize one or more motion-detection sensors (e.g., an IMU, an accelerometer, a gyroscope, etc.) to detect movement of the user. The motion-detection sensors can enable the user engagement engine 204 to determine the speed, direction, and/or type of movement of the user. Additionally or alternatively, the user engagement engine 204 can utilize physiological sensors (e.g., a Galvanic skin response (GSR) sensor, an electroencephalogram (EEG) device, etc.) to monitor physiological states and/or reactions of the user. The user engagement engine 204 can detect any additional or alternative type of user characteristic using any suitable technique and/or device.

As shown in FIG. 2, the user engagement engine 204 can determine a user engagement score (UES) 218 based at least in part on user characteristics 210. The UES 218 can represent a quantitative assessment of the overall level of engagement between the user and the virtual content 212. The level of engagement between the user and the virtual content 212 can correspond to and/or indicate the amount of attention the user directs towards the virtual content 212 (e.g., in comparison to the amount of attention the user directs towards the real world environment). In some cases, a high UES 218 can indicate a high level of engagement with virtual content, and a low UES 218 can indicate a low level of engagement with virtual content.

In some cases, the user engagement engine 204 can determine the UES 218 by weighting individual user characteristics within user characteristics 210. For instance, the user engagement engine 204 can assign a numerical score to each user characteristic that is detected and/or determined to be relevant (e.g., currently displayed by the user). In a non-limiting example, the user engagement engine 204 can assign each user characteristic a score within a predetermined range (e.g., a range of 1-10, where a score of 1 corresponds to the lowest level of user engagement and a score of 10 corresponds to highest level of user engagement). In some cases, the user engagement engine 204 can combine (e.g., by determining an average or mean or other representative value) the individual scores of each of user characteristics 210 to generate a UES 218 that represents a cumulative assessment of the user characteristics 210. In some cases, the predetermined range used to determine the UES 218 can be the same as the predetermined range used by the environmental factor engine 202 to determine the ESS 216. In this way, the ESS 216 and the UES 218 can be normalized (e.g., directly compared). In some cases, the predetermined range used to determine the UES 218 can be different than the predetermined range used by the environmental factor engine 202 to determine the ESS 216. In a non-limiting example, the user engagement engine 204 may identify and assign a score to three user characteristics 210, as follows: (1) the user is running in a straight line, assigned a score of 8; (2) the user is providing verbal instructions to an XR application, assigned a score of 7; and (3) the user is visually tracking a virtual object, assigned a score of 6. In this example, the user engagement engine 204 may determine the UES 218 by averaging the individual scores, resulting in a UES of 7.

As shown in FIG. 2, the content prominence engine 206 can determine a content prominence score (CPS) 220 based at least in part on the virtual content 212. The virtual content 212 can include any virtual content (e.g., audio virtual content, visual virtual content, and/or haptic virtual content) displayed to the user of the extended reality system 100. The CPS 220 can represent a quantitative assessment of the amount and/or type of the virtual content 212 currently displayed to the user. In some examples, a high CPS 220 can correspond to a high prominence of the virtual content 212, and a low CPS 220 can correspond to a low prominence of the virtual content 212.

The content prominence engine 206 can determine the CPS 220 based on various characteristics of the virtual content 212. In some examples, the content prominence engine 206 can determine a content prominence score for each type (e.g., modality) of virtual content within the virtual content 212. For instance, the content prominence engine 206 can determine a first content prominence score associated with audio virtual content, a second content prominence score associated with visual virtual content, and a third content prominence score associated with haptic virtual content. In some examples, the content prominence engine 206 can determine that audio virtual content involving speech has a greater prominence than other audio virtual content (e.g., sound effects, music, etc.). In other examples, the content prominence engine 206 can determine that audio virtual content with a higher volume of audio and/or a higher complexity has a greater prominence than audio virtual content with a lower volume of audio and/or a lower complexity.

In further examples, the content prominence engine 206 can determine that visual virtual content with higher brightness, color saturation and other color characteristics, visual complexity, size, transparency (and/or opaqueness), etc. has a higher prominence than visual virtual content with lower levels of such characteristics. For instance, the content prominence engine 206 can determine that visual virtual content with a lower transparency has a higher prominence than visual virtual content with a higher transparency. In further examples, the content prominence engine 206 can determine that moving virtual content (e.g., animated virtual content) has a higher prominence than stationary virtual content (e.g., especially when located in the periphery of the user's field of vision). In additional examples, the content prominence engine 206 can determine that visual virtual content with a shorter depth (e.g., virtual content appearing closer to the user) has a higher prominence than visual virtual content with a longer depth (e.g., virtual content appearing farther away from the user). In further examples, the content prominence engine 206 can determine that visual virtual content occupying a greater amount of the field of view (FOV) of a display has a higher prominence than visual virtual content occupying a smaller amount of the FOV. In another example, the content prominence engine 206 can determine that visual virtual content with greater complexity (e.g., variation) has a higher prominence than visual virtual content with lower complexity. In another example, the content prominence engine 206 can determine that visual virtual content in certain positions within a display (e.g., positions within a user's main line of vision) has a higher prominence than visual virtual content in other positions.

In some cases, haptic virtual content can include vibrations induced into a hand-held or wearable XR device (e.g., an XR controller, an XR watch, etc.). In one example, the content prominence engine 206 can determine that haptic virtual content with a higher vibration intensity, a higher vibration duration, and/or a higher vibration frequency has a higher prominence than haptic virtual content with a lower vibration intensity, a lower vibration duration, and/or a lower vibration intensity, respectively.

In some cases, the content prominence engine 206 can determine the CPS 220 by assigning a numerical score to individual characteristics associated with the virtual content 212. In a non-limiting example, the content prominence engine 206 can assign each characteristic a score within a predetermined range (e.g., a range of 1-10, where a score of 1 corresponds to the lowest level of prominence and a score of 10 corresponds to highest level of prominence). In some cases, the content prominence engine 206 can combine (e.g., by determining an average or mean or other representative value) the individual scores of each characteristic to generate a CPS 220 that represents a cumulative assessment of the prominence of the virtual content 212. In some cases, the predetermined range used to determine the CPS 220 can be the same as the predetermined range used by the user engagement engine 204 to determine the UES 218 and/or the predetermined range used by the environmental factor engine 202 to determine the ESS 216. In this way, the CPS 220, the ESS 216, and/or the UES 218 can be normalized (e.g., directly compared). In some cases, the predetermined range used to determine the CPS 220 can be different than the predetermined range used to determine the UES 218 and/or the predetermined range used to determine the ESS 216. In some examples, if the content prominence engine 206 determines individual content prominence scores for multiple types of virtual content, the content prominence engine 206 can determine the CPS 220 by averaging the individual content prominence scores. In a non-limiting example, the average of the scores can be a weighted average (e.g., a weight of 0.3 for a visual content prominence score, a weight of 0.5 for an audio content prominence score, and a weight of 0.2 for a haptic content prominence score).

As shown in FIG. 2, the content adjustment system 200 can determine a user distraction score (UDS) 222. The UDS 222 can represent a quantitative assessment of the overall level of distraction of the user due to the virtual content 212. In some cases, a high UDS 222 can indicate a high level of user distraction and a low UDS 222 can indicate a low level of user distraction. The content adjustment system 200 can determine the UDS 222 in various ways. In one example, the content adjustment system 200 can determine the UDS 222 as the UES 218. For instance, the content adjustment system 200 can equate the level of engagement between the user and the virtual content 212 with the level of user distraction due to the virtual content 212. In other examples, the content adjustment system 200 can determine the UDS 222 based on both the UES 218 and the CPS 220. For instance, even if the user is not highly and/or actively engaged with the virtual content 212 (corresponding to a low UES 218), the user may still be distracted by highly prominent content (corresponding to a high CPS 220). In some cases, the content adjustment system 200 can determine the UDS 222 as an average (e.g., a weighted average) of the UES 218 and the CPS 220. In a non-limiting example, the content adjustment system 200 can assign a weight of 0.7 to the UES 218 and a weight of 0.3 to the CPS 220.

In some cases, the content adjustment engine 214 can determine the content adjustment 224 based at least in part on a comparison between the ESS 216 and the UDS 222. For instance, the ESS 216 can represent a "threshold" user distraction score. If the UDS 222 is below the ESS 216, the content adjustment engine 214 can determine that the level of user distraction (and/or the level of engagement between the user and the virtual content 212) does not exceed the threshold level (e.g., is equal to or less than the threshold level). Accordingly, the content adjustment engine 214 can determine to not adjust the virtual content 212 based on the determination that the level of user distraction (and/or the level of engagement between the user and the virtual content 212) does not exceed the threshold level. For instance, the content adjustment engine 214 can determine that an adjustment is unnecessary if the level of user distraction (and/or the level of engagement between the user and the virtual content 212) does not exceed (or is equal to or less than) the threshold level. In other examples, the content adjustment engine 214 can determine to adjust the virtual content 212 (e.g., by increasing the prominence of the virtual content 212). If the UDS 222 exceeds the ESS 216, the content adjustment engine 214 can determine that the level of user distraction (and/or the level of engagement between the user and the virtual content 212) exceeds the threshold level. The content adjustment engine 214 can determine an appropriate content adjustment 224 based on the determination that the level of user distraction (and/or the level of engagement between the user and the virtual content 212) exceeds the threshold level. The content adjustment engine 214 can then apply the appropriate content adjustment 224 to the virtual content 212. As mentioned above, the ESS 216, the UES 218, the CPS 220, and the UDS 222 can be normalized (e.g., determined using scales with the same range). This normalization may facilitate a direct comparison between the ESS 216 and the UDS 222. However, in some cases, the content adjustment system 200 can utilize scores with different ranges and/or the content adjustment engine 214 can determine whether the UDS 222 and the ESS 216 differ by a threshold amount (by an amount defined by the safety threshold or the usability threshold).

The content adjustment engine 214 can determine the appropriate content adjustment 224 in various ways. In some cases, the content adjustment 224 can be designed to decrease or increase the CPS 220. For example, if the UDS 222 is determined using the CPS 220, applying the content adjustment 224 to the virtual content 212 can produce a corresponding decrease or increase in the UDS 222. In some cases, the content adjustment 224 can be configured to produce a decrease in the CPS 220 that results in a UDS 222 that is below the ESS 216. In other cases, the content adjustment 224 can be configured to produce an increase in the CPS 220 that results in a UDS 222 that meets or approaches the ESS 216. In some examples, the content adjustment engine 214 can determine to adjust a particular type (e.g., modality) of virtual content within the virtual content 212. For example, the content adjustment engine 214 can adjust the type of virtual content with the highest prominence, or adjust the type of virtual content with the lowest prominence. In another example, the content adjustment engine 214 can adjust multiple types of virtual content (e.g., two or more of visual virtual content, audio virtual content, and haptic virtual content). In a non-limiting example, the content adjustment engine 214 can adjust types of virtual content in accordance with the weights assigned to the content types when determining the CPS 220.

The content adjustment engine 214 can configure the content adjustment to reduce the prominence of the virtual content 212 in various ways. For example, the content adjustment 224 can include reducing the volume of audio virtual content. Additionally or alternatively, the content adjustment 224 can include reducing the complexity of audio virtual content (e.g., removing speech while allowing sounds effects and/or music). In additional examples, the content adjustment 224 can include reducing the brightness, size, color saturation (and/or other color characteristics), opaqueness, and/or visual complexity of visual virtual content within a display of an XR device. Additionally or alternatively, the content adjustment 224 can include changing the position of the visual virtual content within the display of the XR device. For example, the content adjustment 224 can include increasing the depth of the visual virtual content (e.g., to make the visual virtual content appear further in the background and/or farther away from the user). In another example, if an environmental factor (e.g., a physical obstacle) is blocked from the user's view by a portion of visual virtual content, the content adjustment 224 can include moving the visual virtual content to a different area of the display such that the environmental factor is visible to the user. In further examples, the content adjustment 224 can include reducing and/or stopping movement of animated virtual content. In a further example, the content adjustment 224 can include changing the FOV occupied by the visual virtual content. For example, the content adjustment 224 can include decreasing the size of the FOV in order to increase the visibility of real world objects.

In some cases, the content adjustment 224 can include displaying additional virtual content to the user. The additional virtual content can indicate, to the user, the presence of one or more environmental factors. For example, the content adjustment 224 can include providing, through a headset of an XR device, an audio message that alerts the user about a nearby environmental factor. In another example, the content adjustment 224 can include displaying, within a display of the XR device, an outline of an environmental factor, a label identifying the environmental factor, an arrow pointing to the environmental factor, and/or any suitable visual identification of the environmental factor.

The content adjustment engine 214 can configure the content adjustment to increase the prominence of the virtual content 212 in various ways. For example, the content adjustment 224 can include increasing the volume of audio virtual content. Additionally or alternatively, the content adjustment 224 can include increasing the complexity of audio virtual content (e.g., enabling speech, sound effects, and/or music). In additional examples, the content adjustment 224 can include increasing the brightness, size, color saturation (and/or other color characteristics), opaqueness, and/or visual complexity of visual virtual content within a display of an XR device. Additionally or alternatively, the content adjustment 224 can include changing the position of the visual virtual content within the display of the XR device. For example, the content adjustment 224 can include decreasing the depth of the visual virtual content (e.g., to make the visual virtual content appear closer to the foreground and/or closer from the user). In further examples, the content adjustment 224 can include increasing and/or enabling movement of animated virtual content. In another example, the content adjustment 224 can include changing the FOV occupied by the visual virtual content. For example, the content adjustment 224 can include increasing the size of the FOV. Further, the content adjustment 224 can include removing all or a portion of previous limitations imposed on the prominence of the virtual content 212. For example, if the content adjustment engine 214 previously decreased the prominence of the virtual content 212 based on detecting one or more environmental factors that pose a safety risk to the user, the content adjustment engine 214 can return the virtual content 212 to its original and/or intended state after detecting the one or more environmental factors are no longer present.

Figure 3:
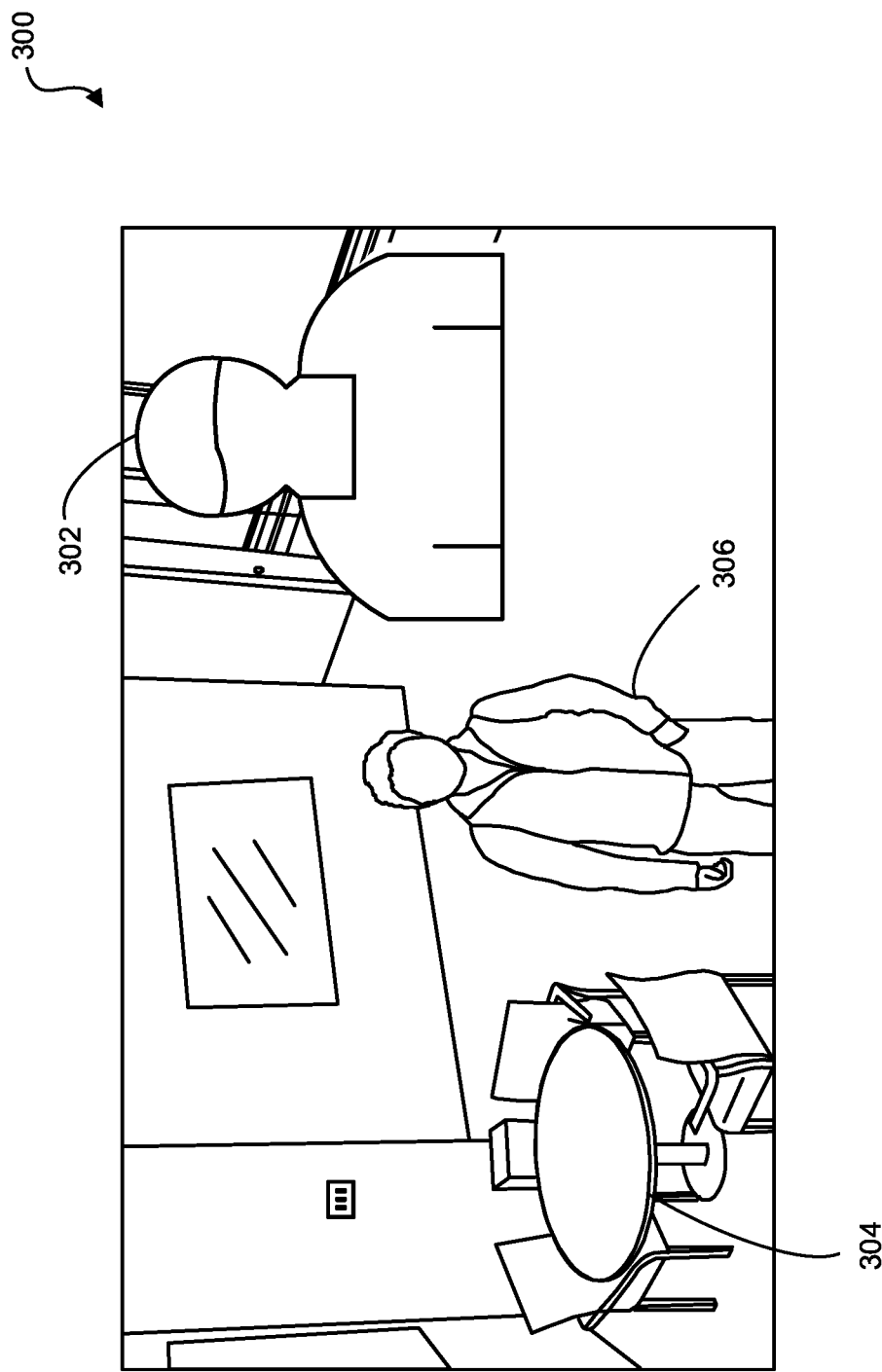
FIG. 3 is an illustration of a display of an extended reality system, in accordance with some examples.

FIG. 3 illustrates an example XR display 300 displayed to a user of an XR device. XR display 300 includes real world content and virtual content overlaid onto the real world content. For example, a table 304 and a person 306 shown in FIG. 3 correspond to physical objects in the real world environment that can be viewed on or through the XR display 300. The XR display 300 can also include an avatar 302, which corresponds to virtual content overlaid onto real world content viewed through the XR display 300. In some cases, the avatar 302 can be accompanied by audio virtual content. In some examples, the content adjustment system 200 of FIG. 2 can determine an environmental safety score (ESS) associated with the real world environment based at least in part on detecting the table 304 and/or the person 306. The content adjustment system 200 can also determine a user distraction score (UDS) associated with the user based at least in part on characteristics of the avatar 302 and/or characteristics of the user. In one example, the content adjustment system 200 can determine that the UDS does not exceed the ESS. Based on determining that the UDS does not exceed the ESS, the content adjustment system 200 can determine to not adjust characteristics of virtual content within the XR display 300 (e.g., the content adjustment system 200 can determine that no adjustments are currently necessary). In another example, based on determining that the UDS does not exceed the ESS, the content adjustment system 200 can determine to adjust characteristics of the virtual content to increase the prominence of the virtual content within the XR display 300. In another example, the content adjustment system 200 can determine that the UDS exceeds the ESS. Based on determining the UDS exceeds the ESS, the content adjustment system 200 can determine to adjust one or more characteristics of the virtual content within the XR display 300. In a further example, the content adjustment system 200 can determine that the UDS meets the ESS (or is sufficiently close to the ESS). Based on determining the UDS meets or is sufficiently close to the ESS, the content adjustment system 200 can determine to not adjust characteristics of the virtual content within the XR display 300.

Figure 4A:
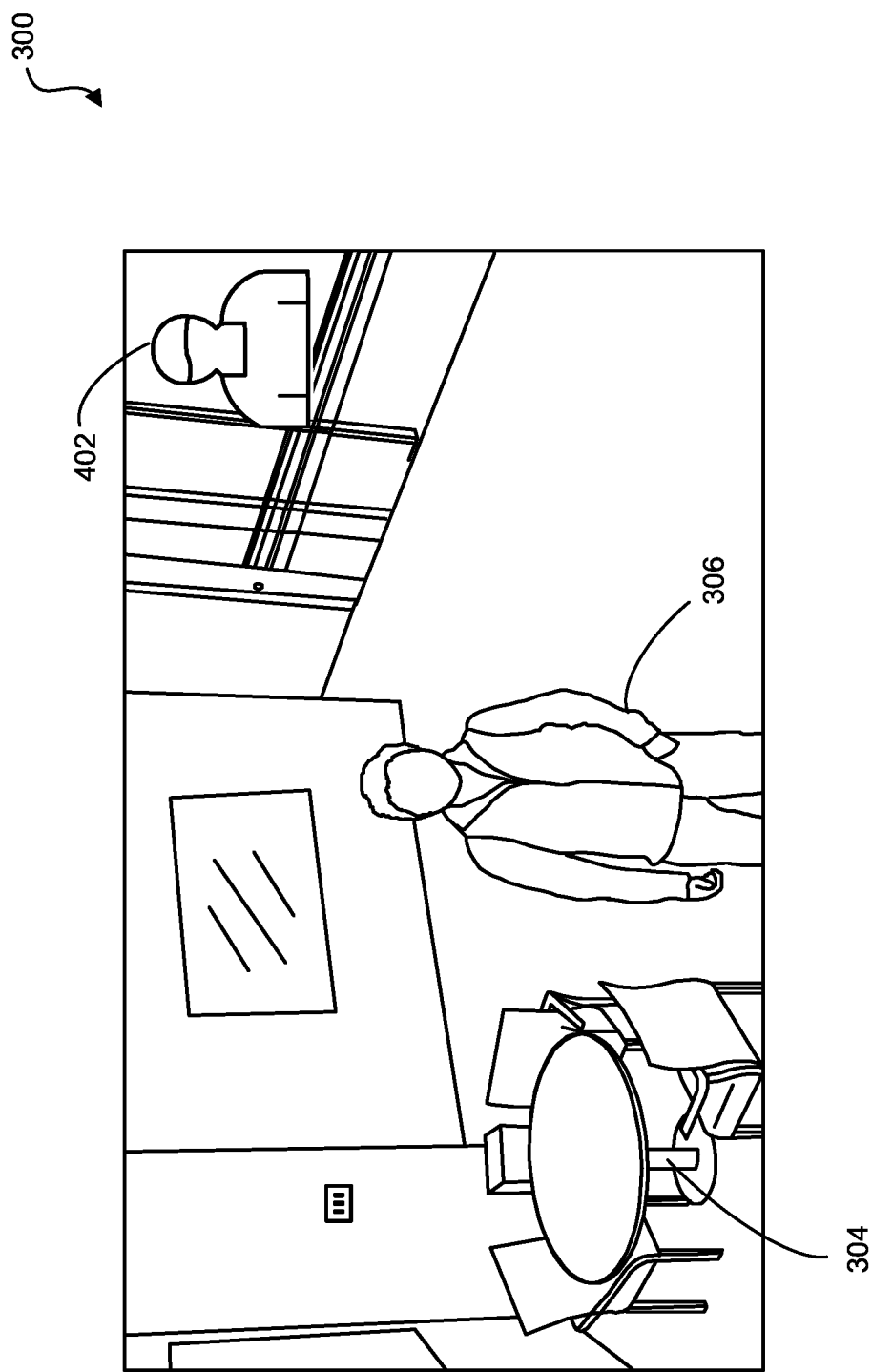
FIG. 4A and FIG. 4B are illustrations of adjustments to virtual content within a display of an extended reality system, in accordance with some examples.

FIG. 4A illustrates an example of adjusting one or more characteristics of the virtual content within the XR display 300 of FIG. 3. In this example, the content adjustment system 200 can determine that the person 306 is attempting to communicate with the user (e.g., based on the person 306 approaching the user and/or addressing the user by name). In response, the content adjustment system 200 can reduce the prominence of the avatar 302. For instance, an adjusted avatar 402 shown in FIG. 4A corresponds to the avatar 302 in FIG. 3 after the content adjustment system 200 reduces the size of the avatar 302. In some cases, the content adjustment system 200 can also reduce the volume and/or complexity of audio content that accompanies the avatar 302. By reducing the prominence of the avatar 302 and/or the accompanying audio content, the content adjustment system 200 can reduce the level of user distraction associated with the avatar 302, thereby enabling the user to direct a sufficient amount of attention to the person 306. In some cases, the content adjustment system 200 can return the adjusted avatar 402 to its original state (e.g., avatar 302) based on determining that the user is no longer communicating with the person 306.

Figure 4B:
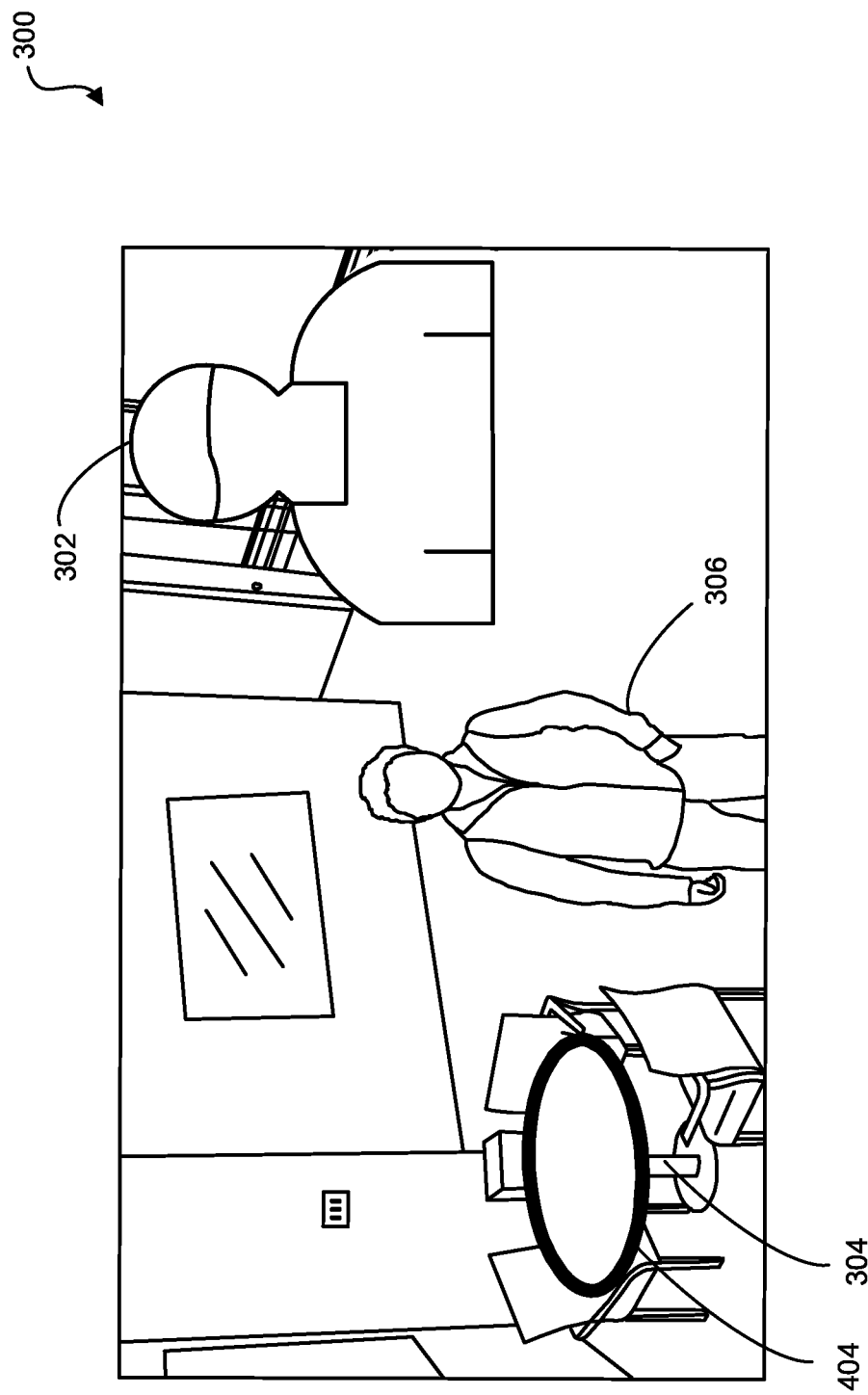

FIG. 4B illustrates another example of adjusting one or more characteristics of the virtual content within the XR display 300 of FIG. 3. In this example, the content adjustment system 200 can determine that the user is moving in a path that includes the table 304. In response, the content adjustment system 200 can indicate the table 304 to the user by displaying additional virtual content within the XR display 300. For instance, as shown in FIG. 4B, the content adjustment system 200 can add a virtual outline 404 that highlights the table 304. The virtual outline 404 can reduce the level of user distraction associated with the avatar 302, thereby enabling the user to change course before colliding with the table 304. In some cases, the content adjustment system 200 can remove the outline 404 from the XR display 300 based on determining that the table 304 is no longer in the path of the user.

In some examples, the content adjustment system 200 can continue to adjust characteristics of the virtual content 212 based on changes to environmental factors within the real world environment and/or based on changes to the level of user distraction due to the virtual content 212. For instance, the XR system 200 can include and/or correspond to a closed-loop system. When implemented as a closed-loop system, the CPS 220 determined by the content prominence engine 206 can represent feedback that is used to determine the UDS 222. Adjustments to the prominence of the virtual content 212 based at least in part on the UDS 222 can represent a system output. The updated CPS 220 resulting from the adjustments to the virtual content 212 can be fed back into to the content adjustment engine 214. In some cases, the content adjustment system 200 (e.g., implemented as a closed-loop system) can maintain appropriate and/or desired levels of virtual content prominence by periodically determining updated environmental safety scores, user engagement scores, content prominence scores, and/or user distraction scores. The updated scores can be determined at periodic intervals (e.g., every 1 second, every 5 seconds, etc.) and/or as needed (e.g., based on changes in the environment and/or the virtual content 212).

In an open-loop system for adjusting virtual content within XR environments, adjustments to the prominence of virtual content can be made based on contextual factors associated with the real world environment and/or other contextual factors. For instance, the adjustments to the prominence of the virtual content can represent system outputs. However, the open-loop system is not configured to receive the adjustments to the prominence of the virtual content as system inputs (and thus the open-loop system does not include a feedback loop). As a result, the open-loop system may not have direct knowledge of how the adjustments to the virtual content impact the level of user distraction due to the virtual content. While the content adjustment system 200 can be implemented as an open-loop system, implementing the content adjustment system 200 as a closed-loop system may enable faster, higher quality, and/or more dynamic adjustments to virtual content.

Figure 5:
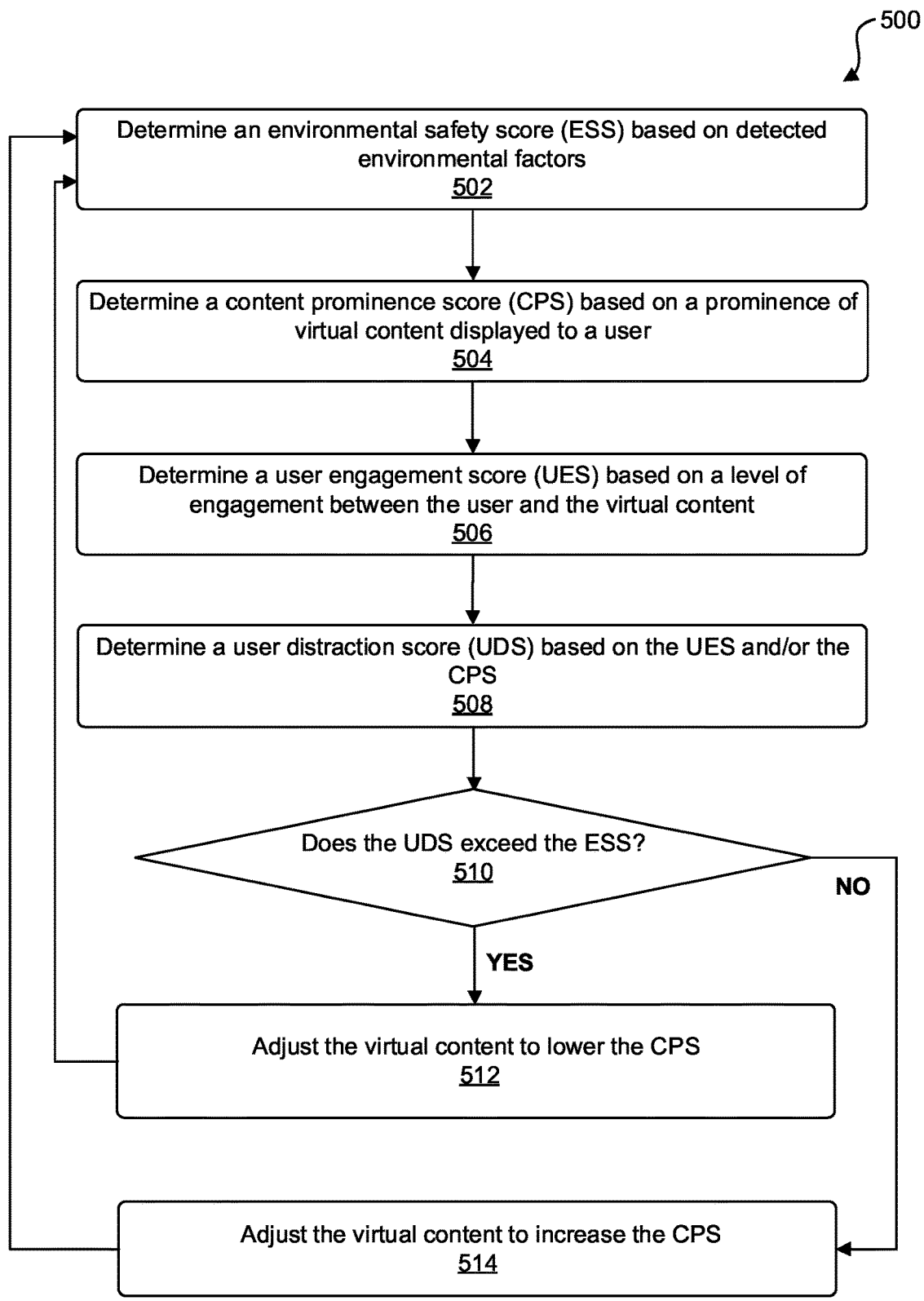
FIG. 5 is a flow diagram illustrating an example of a process for adjusting virtual content within extended reality environments, in accordance with some examples.

FIG. 5 is a flow diagram illustrating an example process 500 for adjusting virtual content within an extended reality system. For the sake of clarity, the process 500 is described with references to the content adjustment system 200 shown in FIG. 2. The steps or operations outlined herein are examples and can be implemented in any combination thereof, including combinations that exclude, add, or modify certain steps or operations.

At block 502, the process 500 includes determining an environmental safety score (ESS) based on detected environmental factors. For instance, the environmental factor engine 202 of the content adjustment system 200 can determine the ESS 216 based at least in part on the environmental factors 208. At block 504, the process 500 includes determining a content prominence score (CPS) based on a prominence of virtual content displayed to a user. For instance, the content prominence engine 206 of the content adjustment system 200 can determine the CPS 220 based at least in part on the virtual content 212.

At block 506, the process 500 includes determining a user engagement score (UES) based on a level of engagement between the user and the virtual content. For instance, the user engagement engine 204 can determine the UES 218 based at least in part on the user characteristics 210. At block 508, the process 500 includes determining a user distraction score (UDS) based on the user engagement score and/or the content prominence score. For instance, the content adjustment system 200 can determine the UDS 222 based at least in part on the UES 218 and/or the CPS 220.

At block 510, the process 500 includes determining whether the UDS exceeds the ESS. For instance, the content adjustment engine 214 of the content adjustment system 200 can determine whether the UDS 222 exceeds the ESS 216 (e.g., by at least a threshold amount, such as the amount defined by the safety threshold). If the process 500 includes determining that the UDS exceeds the ESS (e.g., by at least the threshold amount), the process 500 proceeds to block 512. This determination can indicate that the current level of user distraction due to the virtual content prevents (or is expected to prevent) the user from directing a sufficient amount of attention to the current environmental factors. At block 512, the process 500 includes adjusting the virtual content to lower the CPS. For instance, the content adjustment engine 214 can determine adjustments to one or more characteristics of the virtual content 212 such that, when the adjustments are applied to the virtual content 212, the UDS 222 is lowered to a score below the ESS 216. From block 512, the process 500 returns to block 502. For instance, the content adjustment system 200 can determine updated ESSs, updated CPSs, updated UESs, and/or updated UDSs in order to continue making appropriate adjustments to the virtual content 212.

If the process 500 includes determining that the UDS does not exceed the ESS (e.g., determining the UDS is below the ESS by at least a threshold amount, such as the amount defined by the usability threshold) at block 510, the process 500 proceeds to block 514. This determination can indicate that the current level of user distraction due to the virtual content does not prevent (or is not expected to prevent) the user from directing a sufficient amount of attention to the current environmental factors. In some cases, the determination can also indicate that the prominence of the virtual content can be increased without endangering the user due to the environmental factors. For example, the content adjustment system 200 can increase the prominence of the virtual content 212 such that the UDS 222 meets or approaches (but does not exceed) the ESS 216. In one example, if the content adjustment system 200 previously reduced the prominence of the virtual content 212, the content adjustment system 200 can return the virtual content 212 to its original and/or intended state. From block 514, the process 500 returns to block 502. For instance, the content adjustment system 200 can determine updated ESSs, updated CPSs, updated UESs, and/or updated UDSs in order to continue making appropriate adjustments to the virtual content 212.

Figure 6:
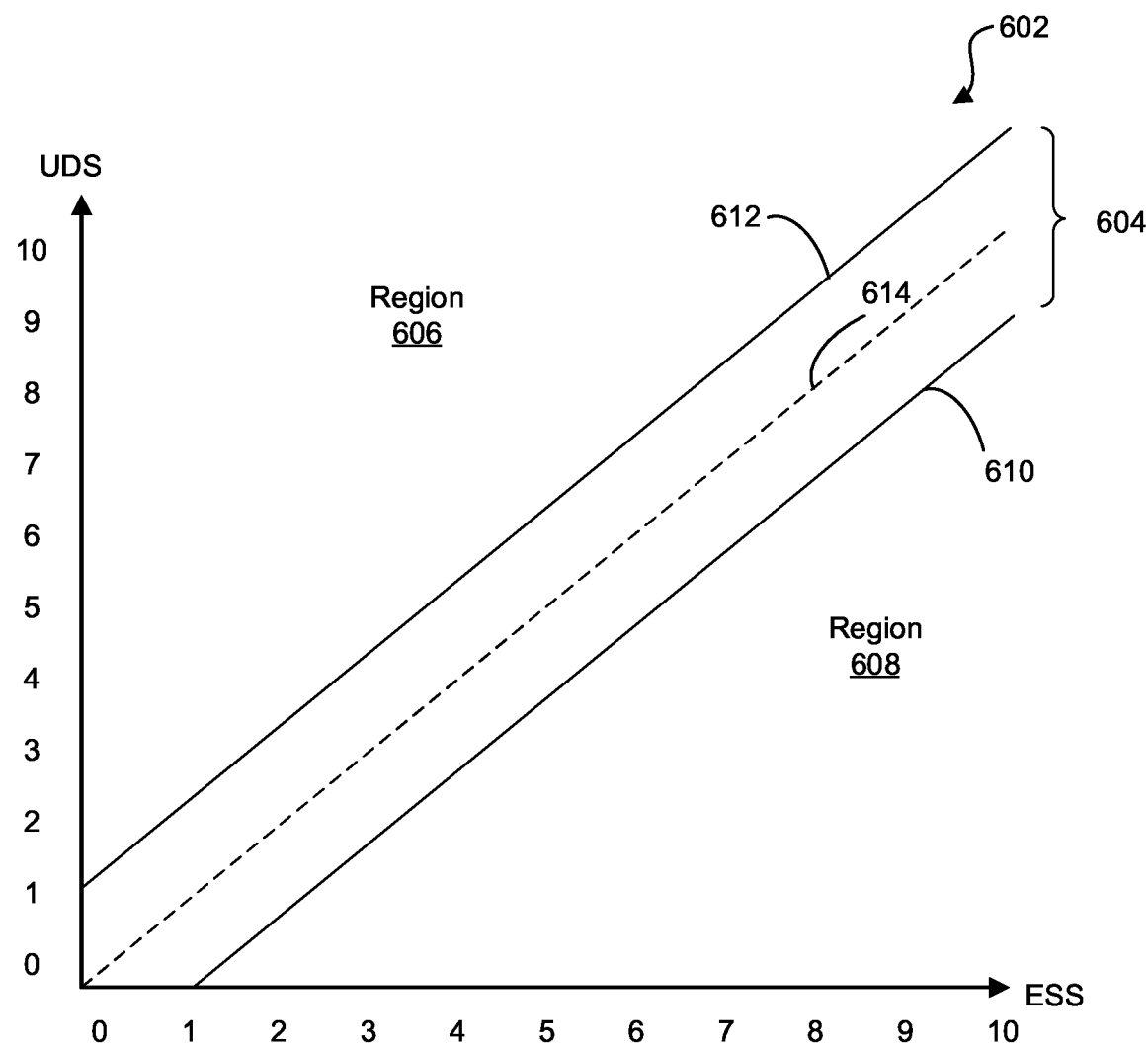
FIG. 6 is a graph illustrating example thresholds for adjusting virtual content within extended reality systems, in accordance with some examples.

FIG. 6 is an example graph 602 that illustrates various thresholds that can be used by the content adjustment system 200 of FIG. 2 to determine appropriate adjustments to the virtual content 212. In this example, the content adjustment system 200 can determine the ESS 216 and the UDS 222 as values within a range of 0-10. In some cases, the content adjustment system 200 can determine whether an (x, y) coordinate pair in which the ESS 216 is the x-axis coordinate and the UDS 222 is the y-axis coordinate falls within a region 604, a region 606, or a region 608 illustrated in the graph 602. As shown, the region 604 can be bounded by a threshold 610 and a threshold 612, with the regions 606 and 608 being located on either side of the region 604. FIG. 6 illustrates the thresholds 610 and 612 being offset by a value of 1 from a line 614 corresponding to UDS=ESS. However, the thresholds 610 and 612 can be offset from the line 614 by any suitable amount (including no offset). In one example, the threshold 612 can correspond to a safety threshold. For example, the content adjustment system 200 can determine that situations in which the UDS 222 exceeds the ESS 216 by more than the safety threshold are likely unsafe for the user. Thus, if the (x, y) coordinate pair corresponding to the ESS 216 and the UDS 222 falls within the region 606, the content adjustment system 200 can reduce the prominence of the virtual content 212. For example, the content adjustment system 200 can reduce the prominence of the virtual content 212 until the UDS 222 meets or is below a suitable value, such as the threshold 612 or the ESS 216.

In one example, the threshold 610 can correspond to a usability threshold. For example, the content adjustment system 200 can determine that situations in which the UDS 222 is below the ESS 216 by more than the usability threshold likely correspond to a poor and/or undesirable XR experience for the user. Thus, if the (x, y) coordinate pair corresponding to the ESS 216 and the UDS 222 falls within the region 608, the content adjustment system 200 can increase the prominence of the virtual content 212. For example, the content adjustment system 200 can increase the prominence of the virtual content 212 until the UDS 222 meets or approaches a suitable value, such as the threshold 610 or the ESS 216. In one example, the region 604 can correspond to a neutral region or a hysteresis region. For example, if the (x, y) coordinate pair corresponding to the ESS 216 and the UDS 222 falls within the region 604, the content adjustment system 200 can determine to not adjust the virtual content 212. In this way, the content adjustment system 200 can avoid unnecessary, annoying, and/or distracting adjustments to the virtual content 212.

In some cases, the content adjustment system 200 can increase or decrease the prominence of the virtual content 212 based on the magnitude of the difference between the ESS 216 and the UDS 222. For example, the content adjustment system 200 can determine and apply proportional and/or weighted adjustments to the virtual content 212. In an illustrative example, the content adjustment system 200 can determine the magnitude of the adjustment to the virtual content 212 using the equation $P(t)=P(t-1)-X(UDS(t)-ESS(t))$, where P is the CPS 220, t is the current time step, and X is a weighting factor. The time step can correspond to any suitable time interval, such as 1 second, 5 seconds, 30 seconds, etc.

FIG. 7 is a flow diagram illustrating an example process 700 for adjusting virtual content provided by extended reality systems. For the sake of clarity, the process 700 is described with references to the content adjustment system 200 shown in FIG. 2. The steps or operations outlined herein are examples and can be implemented in any combination thereof, including combinations that exclude, add, or modify certain steps or operations.

At block 702, the process 700 includes determining a level of distraction of a user of an extended reality system due to virtual content provided by the extended reality system. For instance, the content adjustment system 200 can determine the level of distraction of the user of the extended reality due to the virtual content provided by the extended reality system by determining a level of engagement of the user with the virtual content. Additionally or alternatively, the content adjustment system 200 can determine the level of distraction of the user by determining a prominence of virtual content within a display of the extended reality system, where a high prominence is associated with a high level of distraction. In some cases, the content adjustment system 200 can determine the prominence of the virtual content within the display of the extended reality system by determining at least one of a volume of audio of the virtual content, a size of the virtual content, a type of the virtual content, a brightness of the virtual content, a transparency of the virtual content, a level of movement of the virtual content, one or more color characteristics of the virtual content, a vibration intensity of the virtual content, a vibration frequency of the virtual content, a vibration duration of the virtual content, a field of view of occupied by the virtual content, a visual depth of the virtual content, and a position of the virtual content. In further examples, the content adjustment system 200 can determine the level of engagement between the user and the virtual content at least in part by monitoring one or more physical behaviors of the user. The one or more physical behaviors can indicate at least one of a virtual object and a physical object on which the user is focusing, among other factors as described herein.

At block 704, the process 700 includes determining whether the level of distraction of the user due to the virtual content exceeds or is less than a threshold level of distraction. The threshold level of distraction can be determined based at least in part on one or more environmental factors associated with a real world environment in which the user is located. In some cases, the one or more environmental factors can include a physical object within the real world environment. Additionally or alternatively, the one or more environmental factors can include an interaction between the user of the extended reality system and a person. In some cases, the content adjustment system 200 can determine the threshold level of distraction based at least in part on determining a level of importance of the one or more environmental factors, where a low threshold level of distraction is associated with a high level of importance of the one or more environmental factors. In one example, an environmental factor with a high safety risk to the user is associated with a high level of importance. In some cases, the content adjustment system 200 can determine whether the level of distraction of the user exceeds the threshold level of distraction by comparing the level of distraction of the user with the threshold level of distraction.

At block 706, the process 700 includes adjusting one or more characteristics of the virtual content based on the determination of whether the level of distraction of the user due to the virtual content exceeds or is less than the threshold level of distraction. In one example, if the content adjustment system 200 determines that the level of distraction of the user due to the virtual content exceeds the threshold level of distraction (at block 704), the content adjustment system can adjust the one or more characteristics of the virtual content by outputting, via a display of the extended reality system, an indication of the one or more environmental factors. Additionally or alternatively, the content adjustment system 200 can adjust the one or more characteristics of the virtual content by decreasing a prominence of the virtual content within the display of the extended reality system. In another example, if the content adjustment system 200 determines that the level of distraction of the user due to the virtual content is less than the threshold level of distraction (at block 704), the content adjustment system can adjust the one or more characteristics of the virtual content by increasing a prominence of the virtual content within the display of the extended reality system.

In some cases, the process 700 can include determining an updated level of distraction of the user of the extended reality system due to the virtual content with the adjusted one or more characteristics. In these cases, the process 700 can also include determining an updated threshold level of distraction based at least in part on one or more updated environmental factors associated with the real world environment, where the one or more updated environmental factors are at least partially different than the one or more environmental factors. In some examples, the process 700 can include determining that the updated level of distraction of the user due to the virtual content with the adjusted one or more characteristics exceeds the updated threshold level of distraction and then further adjusting the one or more characteristics of the virtual content based on the determination that the updated level of distraction exceeds the updated threshold level of distraction. Further adjusting the one or more characteristics of the virtual content can decrease a prominence of the virtual content provided by the extended reality system. In some examples, the process 700 can include determining that the updated level of distraction of the user due to the virtual content with the adjusted one or more characteristics is less than the updated threshold level of distraction and further adjusting the one or more characteristics of the virtual content based on determining that the updated level of distraction is less than the updated threshold level of distraction. Further adjusting the one or more characteristics of the virtual content can increase a prominence of the virtual content provided by the extended reality system.

Figure 8:
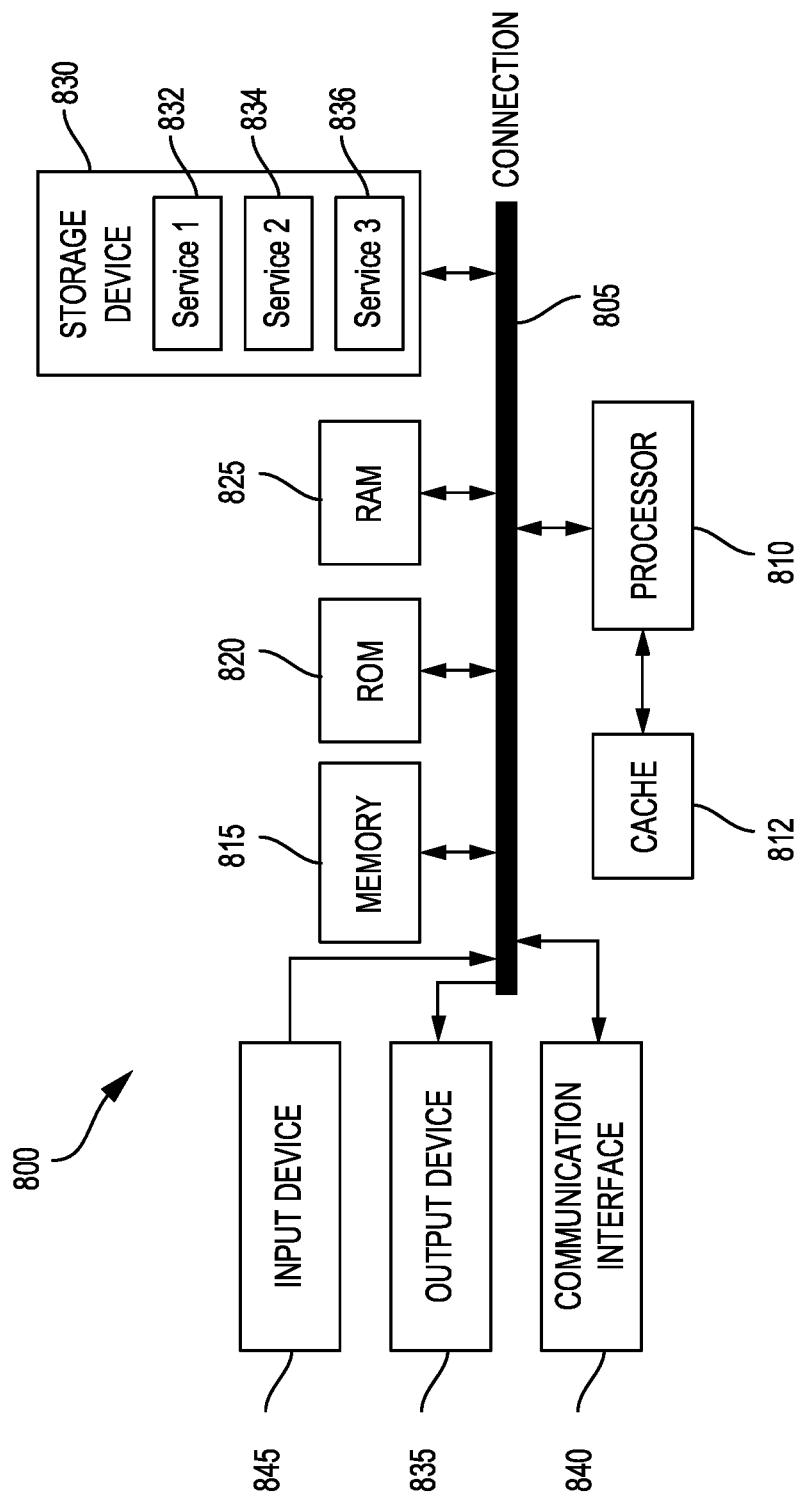
FIG. 8 is a diagram illustrating an example of a system for implementing certain aspects described herein.

FIG. 8 is a diagram illustrating an example of a system for implementing certain aspects of the present technology. In particular, FIG. 8 illustrates an example of computing system 800, which can be for example any computing device making up internal computing system, a remote computing system, a camera, or any component thereof in which the components of the system are in communication with each other using connection 805. Connection 805 can be a physical connection using a bus, or a direct connection into processor 810, such as in a chipset architecture. Connection 805 can also be a virtual connection, networked connection, or logical connection.

In some examples, computing system 800 is a distributed system in which the functions described in this disclosure can be distributed within a datacenter, multiple data centers, a peer network, etc. In some examples, one or more of the described system components represents many such components each performing some or all of the function for which the component is described. In some cases, the components can be physical or virtual devices.

Example system 800 includes at least one processing unit (CPU or processor) 810 and connection 805 that couples various system components including system memory 815, such as read-only memory (ROM) 820 and random access memory (RAM) 825 to processor 810. Computing system 800 can include a cache 812 of high-speed memory connected directly with, in close proximity to, or integrated as part of processor 810.

Processor 810 can include any general purpose processor and a hardware service or software service, such as services 832, 834, and 836 stored in storage device 830, configured to control processor 810 as well as a special-purpose processor where software instructions are incorporated into the actual processor design. Processor 810 may essentially be a completely self-contained computing system, containing multiple cores or processors, a bus, memory controller, cache, etc. A multi-core processor may be symmetric or asymmetric.

To enable user interaction, computing system 800 includes an input device 845, which can represent any number of input mechanisms, such as a microphone for speech, a touch-sensitive screen for gesture or graphical input, keyboard, mouse, motion input, speech, etc. Computing system 800 can also include output device 835, which can be one or more of a number of output mechanisms. In some instances, multimodal systems can enable a user to provide multiple types of input/output to communicate with computing system 800. Computing system 800 can include communications interface 840, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 840 may also include one or more Global Navigation Satellite System (GNSS) receivers or transceivers that are used to determine a location of the computing system 800 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 830 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

The storage device 830 can include software services, servers, services, etc., that when the code that defines such software is executed by the processor 810, it causes the system to perform a function. In some examples, a hardware service that performs a particular function can include the software component stored in a computer-readable medium in connection with the necessary hardware components, such as processor 810, connection 805, output device 835, etc., to carry out the function.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, or the like.

In some examples, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the examples provided herein. However, it will be understood by one of ordinary skill in the art that the examples may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the examples in unnecessary detail. In other instances, well-known circuits, processes, algorithms, structures, and techniques may be shown without unnecessary detail in order to avoid obscuring the examples.

Individual examples may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific examples thereof, but those skilled in the art will recognize that the application is not limited thereto. Thus, while illustrative examples of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, examples can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate examples, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" means A, B, or A and B. In another example, claim language reciting "at least one of A, B, and C" means A, B, C, or A and B, or A and C, or B and C, or A and B and C. The language "at least one of" a set and/or "one or more" of a set does not limit the set to the items listed in the set. For example, claim language reciting "at least one of A and B" can mean A, B, or A and B, and can additionally include items not listed in the set of A and B.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

Illustrative aspects of the present disclosure include:

Aspect 1: An apparatus for adjusting virtual content provided by extended reality systems, the apparatus including: a memory; and a processor coupled to the memory, the processor configured to: determine a level of distraction of a user of an extended reality system due to virtual content provided by the extended reality system; determine whether the level of distraction of the user due to the virtual content exceeds or is less than a threshold level of distraction, the threshold level of distraction being determined based at least in part on one or more environmental factors associated with a real world environment in which the user is located; and adjust one or more characteristics of the virtual content based on the determination of whether the level of distraction of the user due to the virtual content exceeds or is less than the threshold level of distraction.

Aspect 2: The apparatus of aspect 1, wherein the processor is configured to determine the level of distraction of the user of the extended reality system due to the virtual content provided by the extended reality system at least in part by determining a level of engagement between the user and the virtual content.

Aspect 3: The apparatus of aspect 2, wherein the processor is configured to determine the level of engagement between the user and the virtual content at least in part by monitoring one or more physical behaviors of the user.

Aspect 4: The apparatus of aspect 3, wherein the one or more physical behaviors of the user indicate at least one of a virtual object and a physical object on which the user is focusing.

Aspect 5: The apparatus of any one of aspects 1 to 4, wherein the processor is configured to determine the level of distraction of the user of the extended reality system due to the virtual content provided by the extended reality system at least in part by determining a prominence of the virtual content within a display of the extended reality system, a high prominence being associated with a high level of distraction.

Aspect 6: The apparatus of aspect 5, wherein the processor is configured to determine the prominence of the virtual content within the display of the extended reality system at least in part by determining at least one of a volume of audio of the virtual content, a size of the virtual content, a type of the virtual content, a brightness of the virtual content, a transparency of the virtual content, a level of movement of the virtual content, one or more color characteristics of the virtual content, a vibration intensity of the virtual content, a vibration frequency of the virtual content, a vibration duration of the virtual content, a field of view of occupied by the virtual content, a visual depth of the virtual content, and a position of the virtual content.

Aspect 7: The apparatus of any one of aspects 1 to 6, wherein the one or more environmental factors include a physical object within the real world environment.

Aspect 8: The apparatus of any one of aspects 1 to 7, wherein the one or more environmental factors include an interaction between the user of the extended reality system and a person.

Aspect 9: The apparatus of any one of aspects 1 to 8, wherein the processor is configured to determine the threshold level of distraction based at least in part on determining a level of importance of the one or more environmental factors, a low threshold level of distraction being associated with a high level of importance of the one or more environmental factors.

Aspect 10: The apparatus of aspect 9, wherein an environmental factor with a high safety risk to the user is associated with a high level of importance.

Aspect 11: The apparatus of any one of aspects 1 to 10, wherein the processor is configured to: determine that the level of distraction of the user due to the virtual content exceeds the threshold level of distraction; and based on the level of distraction of the user due to the virtual content exceeding the threshold level of distraction, adjust the one or more characteristics of the virtual content by outputting, via a display of the extended reality system, an indication of the one or more environmental factors.

Aspect 12: The apparatus of any one of aspects 1 to 11, wherein the processor is configured to: determine that the level of distraction of the user due to the virtual content exceeds the threshold level of distraction; and based on the level of distraction of the user due to the virtual content exceeding the threshold level of distraction, adjust the one or more characteristics of the virtual content by decreasing a prominence of the virtual content within a display of the extended reality system.

Aspect 13: The apparatus of any one of aspects 1 to 12, wherein the processor is further configured to: determine that the level of distraction of the user due to the virtual content is less than the threshold level of distraction; and based on the level of distraction of the user due to the virtual content being less than the threshold level of distraction, adjust the one or more characteristics of the virtual content by increasing a prominence of the virtual content within a display of the extended reality system.

Aspect 14: The apparatus of any one of aspects 1 to 13, wherein the processor is further configured to: determine an updated level of distraction of the user of the extended reality due to the virtual content with the adjusted one or more characteristics; and determine an updated threshold level of distraction based at least in part on one or more updated environmental factors associated with the real world environment, the one or more updated environmental factors being at least partially different than the one or more environmental factors.

Aspect 15: The apparatus of aspect 14, wherein the processor is further configured to: determine that the updated level of distraction of the user due to the virtual content with the adjusted one or more characteristics exceeds the updated threshold level of distraction; and further adjust the one or more characteristics of the virtual content based on the determination that the updated level of distraction exceeds the updated threshold level of distraction, wherein further adjusting the one or more characteristics of the virtual content decreases a prominence of the virtual content provided by the extended reality system.

Aspect 16: The apparatus of any one of aspects 14 or 15, wherein the processor is further configured to: determine that the updated level of distraction of the user due to the virtual content with the adjusted one or more characteristics is less than the updated threshold level of distraction; and further adjust the one or more characteristics of the virtual content based on determining that the updated level of distraction is less than the updated threshold level of distraction, wherein further adjusting the one or more characteristics of the virtual content increases a prominence of the virtual content provided by the extended reality system.

Aspect 17: A method for adjusting virtual content provided by extended reality systems, the method comprising:

determining a level of distraction of a user of an extended reality system due to virtual content provided by the extended reality system; determining whether the level of distraction of the user due to the virtual content exceeds or is less than a threshold level of distraction, the threshold level of distraction being determined based at least in part on one or more environmental factors associated with a real world environment in which the user is located; and adjusting one or more characteristics of the virtual content based on the determination of whether the level of distraction of the user due to the virtual content exceeds or is less than the threshold level of distraction.

Aspect 18: The method of aspect 17, wherein determining the level of distraction of the user of the extended reality system due to the virtual content provided by the extended reality system includes determining a level of engagement between the user and the virtual content.

Aspect 19: The method of aspect 18, further comprising determining the level of engagement between the user and the virtual content at least in part by monitoring one or more physical behaviors of the user.

Aspect 20: The method of aspect 19, wherein the one or more physical behaviors of the user indicate at least one of a virtual object and a physical object on which the user is focusing.

Aspect 21: The method of any one of aspects 17 to 20, wherein determining the level of distraction of the user of the extended reality system due to the virtual content provided by the extended reality system includes determining a prominence of the virtual content within a display of the extended reality system, a high prominence being associated with a high level of distraction.

Aspect 22: The method of aspect 21, wherein determining the prominence of the virtual content within the display of the extended reality system includes determining at least one of a volume of audio of the virtual content, a size of the virtual content, a type of the virtual content, a brightness of the virtual content, a transparency of the virtual content, a level of movement of the virtual content, one or more color characteristics of the virtual content, a vibration intensity of the virtual content, a vibration frequency of the virtual content, a vibration duration of the virtual content, a field of view of the virtual content, a visual depth of the virtual content, and a position of the virtual content.

Aspect 23: The method of any one of aspects 17 to 22, wherein the one or more environmental factors include a physical object within the real world environment.

Aspect 24: The method of any one of aspects 17 to 23, wherein the one or more environmental factors include an interaction between the user of the extended reality system and a person.

Aspect 25: The method of any one of aspects 17 to 24, further comprising determining the threshold level of distraction based at least in part on determining a level of importance of the one or more environmental factors, a low threshold level of distraction being associated with a high level of importance of the one or more environmental factors.

Aspect 26. The method of aspect 25, wherein an environmental factor with a high safety risk to the user is associated with a high level of importance.

Aspect 27: The method of any one of aspects 17 to 26, further comprising: determining that the level of distraction of the user exceeds the threshold level of distraction, wherein adjusting the one or more characteristics of the virtual content includes outputting, via a display of the extended reality system, an indication of the one or more environmental factors.

Aspect 28: The method of any one of aspects 17 to 27, further comprising: determining that the level of distraction of the user exceeds the threshold level of distraction, wherein adjusting the one or more characteristics of the virtual content includes decreasing a prominence of the virtual content within a display of the extended reality system.

Aspect 29: The method of any one of aspects 17 to 28, further comprising: determining that the level of distraction of the user is less than the threshold level of distraction, wherein adjusting the one or more characteristics of the virtual content includes decreasing a prominence of the virtual content within a display of the extended reality system.

Aspect 30: The method of any one of aspects 17 to 29, further comprising: determining an updated level of distraction of the user of the extended reality system due to the virtual content with the adjusted one or more characteristics; and determining an updated threshold level of distraction based at least in part on one or more updated environmental factors associated with the real world environment, the one or more updated environmental factors being at least partially different than the one or more environmental factors.

Aspect 31: The method of aspect 30, further comprising: determining that the updated level of distraction of the user due to the virtual content with the adjusted one or more characteristics exceeds the updated threshold level of distraction; and further adjusting the one or more characteristics of the virtual content based on determining that the updated level of distraction exceeds the updated threshold level of distraction, wherein further adjusting the one or more characteristics of the virtual content decreases a prominence of the virtual content provided by the extended reality system.

Aspect 32: The method of any one of aspects 30 or 31, further comprising: determining that the updated level of distraction of the user due to the virtual content with the adjusted one or more characteristics is less than the updated threshold level of distraction; and further adjusting the one or more characteristics of the virtual content based on determining that the updated level of distraction is less than the updated threshold level of distraction, wherein further adjusting the one or more characteristics of the virtual content increases a prominence of the virtual content provided by the extended reality system.

Aspect 33: A non-transitory computer-readable storage medium having stored thereon instructions that, when executed by one or more processors, cause the one or more processors to perform operations according to any of aspects 1 to 32.

Aspect 34: An apparatus comprising means for performing operations according to any of aspects 1 to 32.

What is claimed is:

1. An apparatus for adjusting virtual content provided by extended reality systems, the apparatus including:
   a memory; and
   a processor coupled to the memory, the processor configured to:
      determine a level of distraction of a user of an extended reality system due to virtual content by presented on a display of the extended reality system, wherein a real-world environment is viewable through at least a portion of the display of the extended reality system as the virtual content is displayed;

determine a threshold level of distraction based at least in part on one or more environmental factors associated with a real world environment in which the user is located, wherein the one or more environmental factors include at least one of a physical object within the real world environment or an interaction between the user of the extended reality system and a person;

determine whether the level of distraction of the user due to the virtual content exceeds or is less than the threshold level of distraction; and adjust one or more characteristics of the virtual content based on the determination of whether the level of distraction of the user due to the virtual content exceeds or is less than the threshold level of distraction.

2. The apparatus of claim 1, wherein the processor is configured to determine the level of distraction of the user of the extended reality system due to the virtual content provided by the extended reality system at least in part by determining a level of engagement between the user and the virtual content.

3. The apparatus of claim 2, wherein the processor is configured to determine the level of engagement between the user and the virtual content at least in part by monitoring one or more physical behaviors of the user.

4. The apparatus of claim 3, wherein the one or more physical behaviors of the user indicate at least one of a virtual object or a physical object on which the user is focusing.

5. The apparatus of claim 1, wherein the processor is configured to determine the level of distraction of the user of the extended reality system due to the virtual content provided by the extended reality system at least in part by determining a prominence of the virtual content within the display of the extended reality system, a high prominence being associated with a high level of distraction.

6. The apparatus of claim 5, wherein the processor is configured to determine the prominence of the virtual content within the display of the extended reality system at least in part by determining at least one of a volume of audio of the virtual content, a size of the virtual content, a type of the virtual content, a brightness of the virtual content, a transparency of the virtual content, a level of movement of the virtual content, one or more color characteristics of the virtual content, a vibration intensity of the virtual content, a vibration frequency of the virtual content, a vibration duration of the virtual content, a field of view of occupied by the virtual content, a visual depth of the virtual content, or a position of the virtual content.

7. The apparatus of claim 1, wherein the processor is configured to determine the threshold level of distraction further based on determining a level of importance of the one or more environmental factors, a low threshold level of distraction being associated with a high level of importance of the one or more environmental factors.

8. The apparatus of claim 7, wherein an environmental factor with a high safety risk to the user is associated with a high level of importance.

9. The apparatus of claim 1, wherein the processor is configured to:

determine that the level of distraction of the user due to the virtual content exceeds the threshold level of distraction; and based on the level of distraction of the user due to the virtual content exceeding the threshold level of distraction, adjust the one or more characteristics of the virtual content by outputting, via the display of the extended reality system, an indication of the one or more environmental factors.

10. The apparatus of claim 1, wherein the processor is configured to:

determine that the level of distraction of the user due to the virtual content exceeds the threshold level of distraction; and based on the level of distraction of the user due to the virtual content exceeding the threshold level of distraction, adjust the one or more characteristics of the virtual content by decreasing a prominence of the virtual content within the display of the extended reality system.

11. The apparatus of claim 1, wherein the processor is further configured to:

determine that the level of distraction of the user due to the virtual content is less than the threshold level of distraction; and based on the level of distraction of the user due to the virtual content being less than the threshold level of distraction, adjust the one or more characteristics of the virtual content by increasing a prominence of the virtual content within the display of the extended reality system.

12. The apparatus of claim 1, wherein the processor is further configured to:

determine an updated level of distraction of the user of the extended reality system due to the virtual content with the adjusted one or more characteristics; and determine an updated threshold level of distraction based at least in part on one or more updated environmental factors associated with the real world environment, the one or more updated environmental factors being at least partially different than the one or more environmental factors.

13. The apparatus of claim 12, wherein the processor is further configured to:

determine that the updated level of distraction of the user due to the virtual content with the adjusted one or more characteristics exceeds the updated threshold level of distraction; and further adjust the one or more characteristics of the virtual content based on the determination that the updated level of distraction exceeds the updated threshold level of distraction, wherein further adjusting the one or more characteristics of the virtual content decreases a prominence of the virtual content provided by the extended reality system.

14. The apparatus of claim 12, wherein the processor is further configured to:

determine that the updated level of distraction of the user due to the virtual content with the adjusted one or more characteristics is less than the updated threshold level of distraction; and further adjust the one or more characteristics of the virtual content based on determining that the updated level of distraction is less than the updated threshold level of distraction, wherein further adjusting the one or more characteristics of the virtual content increases a prominence of the virtual content provided by the extended reality system.

15. A method for adjusting virtual content provided by extended reality systems, the method comprising:

determining a level of distraction of a user of an extended reality system due to virtual content presented on a display of the extended reality system, wherein a real-world environment is viewable through at least a portion of the display of the extended reality system as the virtual content is displayed;
determining a threshold level of distraction based at least in part on one or more environmental factors associated with a real world environment in which the user is located, wherein the one or more environmental factors include at least one of a physical object within the real world environment or an interaction between the user of the extended reality system and a person;
determining whether the level of distraction of the user due to the virtual content exceeds or is less than the threshold level of distraction; and
adjusting one or more characteristics of the virtual content based on the determination of whether the level of distraction of the user due to the virtual content exceeds or is less than the threshold level of distraction.

16. The method of claim 15, wherein determining the level of distraction of the user of the extended reality system due to the virtual content provided by the extended reality system includes determining a level of engagement between the user and the virtual content.

17. The method of claim 16, further comprising determining the level of engagement between the user and the virtual content at least in part by monitoring one or more physical behaviors of the user.

18. The method of claim 17, wherein the one or more physical behaviors of the user indicate at least one of a virtual object or a physical object on which the user is focusing.

19. The method of claim 15, wherein determining the level of distraction of the user of the extended reality system due to the virtual content provided by the extended reality system includes determining a prominence of the virtual content within the display of the extended reality system, a high prominence being associated with a high level of distraction.

20. The method of claim 19, wherein determining the prominence of the virtual content within the display of the extended reality system includes determining at least one of a volume of audio of the virtual content, a size of the virtual content, a type of the virtual content, a brightness of the virtual content, a transparency of the virtual content, a level of movement of the virtual content, one or more color characteristics of the virtual content, a vibration intensity of the virtual content, a vibration frequency of the virtual content, a vibration duration of the virtual content, a field of view of the virtual content, a visual depth of the virtual content, or a position of the virtual content.

21. The method of claim 15, further comprising determining the threshold level of distraction further based on determining a level of importance of the one or more environmental factors, a low threshold level of distraction being associated with a high level of importance of the one or more environmental factors.

22. The method of claim 21, wherein an environmental factor with a high safety risk to the user is associated with a high level of importance.

23. The method of claim 15, further comprising:
determining that the level of distraction of the user exceeds the threshold level of distraction, wherein adjusting the one or more characteristics of the virtual content includes outputting, via the display of the extended reality system, an indication of the one or more environmental factors.

24. The method of claim 15, further comprising:
determining that the level of distraction of the user exceeds the threshold level of distraction, wherein adjusting the one or more characteristics of the virtual content includes decreasing a prominence of the virtual content within the display of the extended reality system.

25. The method of claim 15, further comprising:
determining that the level of distraction of the user is less than the threshold level of distraction, wherein adjusting the one or more characteristics of the virtual content includes increasing a prominence of the virtual content within the display of the extended reality system.

26. The method of claim 15, further comprising:
determining an updated level of distraction of the user of the extended reality system due to the virtual content with the adjusted one or more characteristics; and
determining an updated threshold level of distraction based at least in part on one or more updated environmental factors associated with the real world environment, the one or more updated environmental factors being at least partially different than the one or more environmental factors.

27. The method of claim 26, further comprising:
determining that the updated level of distraction of the user due to the virtual content with the adjusted one or more characteristics exceeds the updated threshold level of distraction; and
further adjusting the one or more characteristics of the virtual content based on determining that the updated level of distraction exceeds the updated threshold level of distraction, wherein further adjusting the one or more characteristics of the virtual content decreases a prominence of the virtual content provided by the extended reality system.

28. The method of claim 26, further comprising:
determining that the updated level of distraction of the user due to the virtual content with the adjusted one or more characteristics is less than the updated threshold level of distraction; and
further adjusting the one or more characteristics of the virtual content based on determining that the updated level of distraction is less than the updated threshold level of distraction, wherein further adjusting the one or more characteristics of the virtual content increases a prominence of the virtual content provided by the extended reality system.

29. A non-transitory computer-readable storage medium having stored thereon instructions that, when executed by one or more processors, cause the one or more processors to:
determine a level of distraction of a user of an extended reality system due to virtual content presented on a display of the extended reality system, wherein a real-world environment is viewable through at least a portion of the display of the extended reality system as the virtual content is displayed;
determine a threshold level of distraction based at least in part on one or more environmental factors associated with a real world environment in which the user is located, wherein the one or more environmental factors include at least one of a physical object within the real world environment or an interaction between the user of the extended reality system and a person;
determine whether the level of distraction of the user due to the virtual content exceeds or is less than the threshold level of distraction; and
adjust one or more characteristics of the virtual content based on the determination of whether the level of distraction of the user due to the virtual content exceeds or is less than the threshold level of distraction.

30. The non-transitory computer-readable storage medium of claim 29, wherein adjusting the one or more characteristics of the virtual content includes decreasing a prominence of the virtual content within a display of the extended reality system.

31. The non-transitory computer-readable storage medium of claim 29, wherein the instructions, when executed by the one or more processors, cause the one or more processors to determine the level of distraction of the user of the extended reality system due to the virtual content provided by the extended reality system at least in part by determining a level of engagement between the user and the virtual content.

32. The non-transitory computer-readable storage medium of claim 31, wherein the instructions, when executed by the one or more processors, cause the one or more processors to determine the level of engagement between the user and the virtual content at least in part by monitoring one or more physical behaviors of the user.

33. The non-transitory computer-readable storage medium of claim 29, wherein the instructions, when executed by the one or more processors, cause the one or more processors to determine the level of distraction of the user of the extended reality system due to the virtual content provided by the extended reality system at least in part by determining a prominence of the virtual content within the display of the extended reality system, a high prominence being associated with a high level of distraction.

34. The non-transitory computer-readable storage medium of claim 29, wherein the instructions, when executed by the one or more processors, cause the one or more processors to determine the threshold level of distraction further based on determining a level of importance of the one or more environmental factors, a low threshold level of distraction being associated with a high level of importance of the one or more environmental factors.

* * * * *